(12) United States Patent
Jesme et al.

(10) Patent No.: US 11,141,835 B2
(45) Date of Patent: Oct. 12, 2021

(54) MANIPULATION OF MAGNETIZABLE ABRASIVE PARTICLES WITH MODULATION OF MAGNETIC FIELD ANGLE OR STRENGTH

(71) Applicant: 3M INNOVATIVE PROPERTIES COMPANY, St. Paul, MN (US)

(72) Inventors: Ronald D. Jesme, Plymouth, MN (US); Thomas J. Nelson, Woodbury, MN (US); Joseph B. Eckel, Vadnais Heights, MN (US); Aaron K. Nienaber, Maplewood, MN (US); Vincent R. Jansen, Stillwater, MN (US); Samad Javid, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/478,526

(22) PCT Filed: Jan. 10, 2018

(86) PCT No.: PCT/US2018/013065
§ 371 (c)(1),
(2) Date: Jul. 17, 2019

(87) PCT Pub. No.: WO2018/136268
PCT Pub. Date: Jul. 26, 2018

(65) Prior Publication Data
US 2019/0329380 A1 Oct. 31, 2019

Related U.S. Application Data

(60) Provisional application No. 62/448,175, filed on Jan. 19, 2017.

(51) Int. Cl.
*B24D 3/34* (2006.01)
*B24D 11/00* (2006.01)
(Continued)

(52) U.S. Cl.
CPC .............. *B24D 3/34* (2013.01); *B24D 11/001* (2013.01); *B24D 18/0009* (2013.01); *C09K 3/1445* (2013.01)

(58) Field of Classification Search
CPC .... B24D 18/0009; B24D 99/005; B24D 3/10; B24D 18/00; B24D 3/14; B24D 18/0072;
(Continued)

(56) References Cited

U.S. PATENT DOCUMENTS

| 2,370,636 A | 3/1945 | Carlton |
| 2,857,879 A * | 10/1958 | Johnson ............... B24D 11/005 118/623 |

(Continued)

FOREIGN PATENT DOCUMENTS

| CN | 104999385 | 10/2015 |
| CN | 105269474 | 1/2016 |

(Continued)

OTHER PUBLICATIONS

Barbee, "Microstructure of Amorphous 304 Stainless Steel-Carbon Alloys Synthesized by Magnetron Sputter Deposition", Thin Solid Films, 1979, vol. 63, pp. 143-150.
(Continued)

*Primary Examiner* — Pegah Parvini
(74) *Attorney, Agent, or Firm* — Katherine M. Scholz

(57) ABSTRACT

According to one embodiment, a method of making an abrasive article is disclosed. The method can comprise: providing a surface; disposing magnetizable abrasive particles on the surface; and varying a magnetic field relative to the magnetizable abrasive particles to impart a non-random
(Continued)

orientation and/or alignment to the magnetizable abrasive particles relative to the surface.

15 Claims, 16 Drawing Sheets

(51) Int. Cl.
*B24D 18/00* (2006.01)
*C09K 3/14* (2006.01)

(58) Field of Classification Search
CPC .... B24D 18/0018; B24D 3/008; B24D 11/00; B24D 3/342; B24D 5/02; B24D 11/001; B24D 11/005; B24D 3/18; B24D 3/34; B24D 5/12; B24D 7/02; B24D 11/02; B24D 13/147; B24D 3/00; B24D 3/002; B24D 3/005; B24D 3/20; B24D 3/24; B24D 3/30; B24D 5/00; B24D 5/04; B24D 5/14; B24D 7/066; B24D 7/16; B24D 7/18; B24D 9/10; C09K 3/1409; C09K 3/1436; C09K 3/1445
See application file for complete search history.

(56) References Cited

U.S. PATENT DOCUMENTS

| | | | |
|---|---|---|---|
| 3,625,666 | A | 12/1971 | James |
| 4,008,055 | A | 2/1977 | Phaal |
| 4,314,827 | A | 2/1982 | Leitheiser |
| 4,612,242 | A | 9/1986 | Vesley |
| 4,623,364 | A | 11/1986 | Cottringer |
| 4,652,275 | A | 3/1987 | Bloecher |
| 4,734,104 | A | 3/1988 | Broberg |
| 4,744,802 | A | 5/1988 | Schwabel |
| 4,751,137 | A | 6/1988 | Halg |
| 4,770,671 | A | 9/1988 | Monroe |
| 4,881,951 | A | 11/1989 | Wood |
| 5,137,542 | A | 8/1992 | Buchanan |
| 5,152,917 | A | 10/1992 | Pieper |
| 5,181,939 | A | 1/1993 | Neff |
| 5,201,916 | A | 4/1993 | Berg |
| 5,213,590 | A * | 5/1993 | Neff .................. B24D 3/08 209/8 |
| 5,366,523 | A | 11/1994 | Rowenhorst |
| 5,417,726 | A | 5/1995 | Stout |
| 5,573,619 | A | 11/1996 | Benedict |
| RE35,570 | E | 7/1997 | Rowenhorst |
| 5,942,015 | A | 8/1999 | Culler |
| 5,984,988 | A | 11/1999 | Berg |
| 6,120,568 | A | 9/2000 | Neff |
| 6,261,682 | B1 | 7/2001 | Law |
| 7,727,931 | B2 | 6/2010 | Brey |
| 8,034,137 | B2 | 10/2011 | Erickson |
| 8,142,531 | B2 | 3/2012 | Adefris |
| 8,262,758 | B2 | 9/2012 | Gao |
| 8,698,394 | B2 | 4/2014 | McCutcheon |
| 2008/0289262 | A1 | 11/2008 | Gao |
| 2009/0325466 | A1 | 12/2009 | Kincaid |
| 2013/0244552 | A1 | 9/2013 | Lee |
| 2014/0106126 | A1 | 4/2014 | Gaeta |
| 2015/0068131 | A1 | 3/2015 | Sanchez |
| 2015/0259587 | A1 * | 9/2015 | Oldenkotte .......... C09K 3/1418 51/309 |
| 2016/0144480 | A1 | 5/2016 | Eugster |

FOREIGN PATENT DOCUMENTS

| | | |
|---|---|---|
| EP | 1122718 | 8/2001 |
| GB | 1477767 | 6/1977 |
| JP | 2004-098265 | 4/2004 |
| WO | WO 2012-112305 | 8/2012 |
| WO | WO 2014/206967 | 12/2014 |
| WO | WO 2015-100018 | 7/2015 |
| WO | WO 2015-100020 | 7/2015 |
| WO | WO 2015-100220 | 7/2015 |
| WO | WO 2016-205267 | 12/2016 |
| WO | WO 2017-007703 | 1/2017 |
| WO | WO 2017-007714 | 1/2017 |
| WO | WO 2018-080703 | 5/2018 |
| WO | WO 2018-080704 | 5/2018 |
| WO | WO 2018-080705 | 5/2018 |
| WO | WO 2018-080755 | 5/2018 |
| WO | WO 2018-080756 | 5/2018 |
| WO | WO 2018-080765 | 5/2018 |
| WO | WO 2018-080784 | 5/2018 |
| WO | WO 2018-080799 | 5/2018 |
| WO | WO 2018-136269 | 7/2018 |

OTHER PUBLICATIONS

International Search Report for PCT International Application No. PCT/US2018/013065, dated May 10, 2018, 3pgs.
EP Extended Search Report, EP 18741756.3, dated Oct. 5, 2020, 7 pages.

* cited by examiner

MANIPULATION OF MAGNETIZABLE ABRASIVE PARTICLES WITH MODULATION OF MAGNETIC FIELD ANGLE OR STRENGTH

CROSS REFERENCE TO RELATED APPLICATIONS

This application is a national stage filing under 35 U.S.C. 371 of PCT/US2018/013065, filed Jan. 10, 2018, which claims the benefit of U.S. Provisional Application No. 62/448,175, filed Jan. 10, 2017, the disclosure of which is incorporated by reference in its entirety herein.

TECHNICAL FIELD

This document pertains generally, but not by way of limitation, to abrasive particles, abrasive articles, and related apparatuses, systems and methods.

BACKGROUND

Various types of abrasive articles are known in the art. For example, coated abrasive articles generally have abrasive particles adhered to a backing by a resinous binder material. Examples include sandpaper and structured abrasives having precisely shaped abrasive composites adhered to a backing. The abrasive composites generally include abrasive particles and a resinous binder.

Bonded abrasive wheels include abrasive rods bonded together by a bonding medium (i.e., a binder) in the shape of a circular wheel, typically around a central hub. Bonded abrasive wheels include, for example, grinding wheels and cut-off wheels. The bonding medium may be an organic resin (e.g., resin bond wheels), but may also be an inorganic material such as a ceramic or glass (i.e., vitreous bond wheels).

Coated abrasive articles are conventionally coated by either drop coating or electrostatic coating of the abrasive particles onto a resin coated backing. Of the two methods, electrostatic coating has been often preferred, as it provides some degree of orientation control for particles having an aspect ratio other than one.

In general, positioning and orientation of the abrasive particles and their cutting points is important in determining abrasive performance and orientation. PCT International Publ. No. WO 2012/112305 A2 (Keipert) discloses coated abrasive articles manufactured through use of precision screens having precisely spaced and aligned non-circular apertures to hold individual abrasive particles in fixed positions that can be used to rotationally align a surface feature of the abrasive particles in a specific z-direction rotational orientation. In that method, a screen or perforated plate is laminated to an adhesive film and loaded with abrasive particles. The orientation of the abrasive particles could be controlled by the screen geometry and the restricted ability of the abrasive particles to contact and adhere to the adhesive through the screen openings. Removal of the adhesive layer from the filled screen transferred the oriented abrasive particles in an inverted fashion to an abrasive backing. The method relies on the presence of adhesive which can be cumbersome, prone to detackifying (e.g., due to dust deposits) over time, and which can transfer to the resultant coated abrasive article creating the possibility of adhesive transfer to, and contamination of, a workpiece.

Overview

Relative positioning, alignment and orientation of abrasive particles in an abrasive article can be important. If the abrasive particles are inverted (so as to be base up) or are out of alignment with respect to a cutting direction, a premature breakdown of the abrasive article can occur. Conventional methods such as drop coating and electrostatic deposition provide a random distribution of spacing and particle clustering often results where two or more shaped abrasive particles end up touching each other near the tips or upper surfaces of the shaped abrasive particles. Clustering can lead to poor cutting performance due to local enlargement of bearing areas in those regions and inability of the shaped abrasive particles in the cluster to fracture and breakdown properly during use because of mutual mechanical reinforcement. Clustering can create undesirable heat buildup compared to coated abrasive articles having more uniformly spaced shaped abrasive particles.

In view of the foregoing, the present inventors have recognized, among other things, that a variety of abrasive articles can benefit from more precise orientation and/or alignment of abrasive particles. As such, the present inventors have developed processes, systems and apparatuses that vary a magnetic field to control the magnetizable adhesive particles orientation and/or alignment on a backing. More particularly, the present inventors have discovered that an applied magnetic field when varied in angle or strength relative to the magnetizable abrasive particles can be used to achieve a desired orientation and/or alignment of the particles on a backing. Such varying of the magnetic field can be accomplished by multiple processes some of which are described in the embodiments that follow. The processes can achieve desired orientation and/or alignment of abrasive particles in abrasive articles, thereby reducing the likelihood of premature breakdown and poor cutting performance.

According to one exemplary embodiment, a method of making an abrasive article is disclosed. The method can comprise: providing a surface; disposing magnetizable abrasive particles on the surface; and varying a magnetic field relative to the magnetizable abrasive particles to impart a non-random orientation and/or alignment to the magnetizable abrasive particles relative to the surface.

According to another exemplary embodiment, a method of making a coated abrasive article is disclosed. The method can comprise: providing a backing; disposing magnetizable abrasive particles on the backing; varying a magnetic field relative to the magnetizable abrasive particles to impart a non-random orientation and/or alignment to the magnetizable abrasive particles relative to the backing.

According to yet another exemplary embodiment, a method of making a bonded abrasive article is disclosed. The method can comprise: disposing a layer of a curable composition into a mold having a circular mold cavity with a central hub, wherein the circular mold cavity has an outer circumference and a rotational axis extending through the central hub, and wherein the curable composition is comprised of at least some magnetizable abrasive particles dispersed therein; and varying a magnetic field relative to the curable composition such that a majority of the magnetizable abrasive particles are at least one of oriented and aligned in a non-random manner relative to a surface of the mold; and at least partially curing the curable composition to provide the bonded abrasive article. According to another exemplary embodiment, a method of making a non-woven abrasive article is disclosed. The method can comprise: providing one of a non-woven backing; disposing magnetizable abrasive particles on the backing; varying a magnetic field relative to the magnetizable abrasive particles to impart a non-random orientation and/or alignment of the magnetizable abrasive particles relative to the backing.

As used herein:

The term "a", "an", and "the" are used interchangeably with "at least one" to mean one or more of the elements being described.

The term "and/or" means either or both. For example "A and/or B" means only A, only B, or both A and B.

The terms "including," "comprising," or "having," and variations thereof, are meant to encompass the items listed thereafter and equivalents thereof as well as additional items.

Unless specified or limited otherwise, the term "coupled" and variations thereof are used broadly and encompass both direct and indirect couplings.

The phrase "major surface" or variations thereof, are used to describe an article having a thickness that is small relative to its length and width. The length and width of such articles can define the "major surface" of the article, but this major surface, as well as the article, need not be flat or planar. For example, the above phrases can be used to describe an article having a first ratio ($R_1$) of thickness (e.g., in a Z direction that is orthogonal to a major surface of the article at any point along the major surface) to a first surface dimension of the major surface (e.g., width or length), and a second ratio ($R_2$) of thickness to a second surface dimension of the major surface, where the first ratio ($R_1$) and the second ratio ($R_2$) are both less than 0.1. In some embodiments, the first ratio ($R_1$) and the second ratio ($R_2$) can be less than 0.01; in some embodiments, less than 0.001; and in some embodiments, less than 0.0001. Note that the two surface dimensions need not be the same, and the first ratio ($R_1$) and the second ratio ($R_2$) need not be the same, in order for both the first ratio ($R_1$) and the second ratio ($R_2$) to fall within the desired range. In addition, none of the first surface dimension, the second surface dimension, the thickness, the first ratio ($R_1$), and the second ratio ($R_2$) need to be constant in order for both the first ratio ($R_1$) and the second ratio ($R_2$) to fall within the desired range.

The term "ceramic" refers to any of various hard, brittle, heat- and corrosion-resistant materials made of at least one metallic element (which can include silicon) combined with oxygen, carbon, nitrogen, or sulfur.

The term "conductive" means electrically conductive (e.g., at the level of a conductor), unless otherwise specified.

The term "ferrimagnetic" refers to materials that exhibit ferrimagnetism. Ferrimagnetism is a type of permanent magnetism that occurs in solids in which the magnetic fields associated with individual atoms spontaneously align themselves, some parallel, or in the same direction (as in ferromagnetism), and others generally antiparallel, or paired off in opposite directions (as in antiferromagnetism). The magnetic behavior of single crystals of ferrimagnetic materials can be attributed to the parallel alignment; the diluting effect of those atoms in the antiparallel arrangement keeps the magnetic strength of these materials generally less than that of purely ferromagnetic solids such as metallic iron. Ferrimagnetism occurs chiefly in magnetic oxides known as ferrites. The spontaneous alignment that produces ferrimagnetism is entirely disrupted above a temperature called the Curie point, characteristic of each ferrimagnetic material. When the temperature of the material is brought below the Curie point, ferrimagnetism revives.

The term "magnet" can include a ferromagnetic material that responds to a magnetic field and acts as a magnet. "Magnet" can be any material that exerts a magnetic field in either a permanent, semi-permanent, or temporary state. The term "magnet" can be one individual magnet or an assembly of magnets that would act like a single magnet. The term "magnet" can include permanent magnets and electromagnets.

The term "ferromagnetic" refers to materials that exhibit ferromagnetism. Ferromagnetism is a physical phenomenon in which certain electrically uncharged materials strongly attract others. In contrast to other substances, ferromagnetic materials are magnetized easily, and in strong magnetic fields the magnetization approaches a definite limit called saturation. When a field is applied and then removed, the magnetization does not return to its original value. This phenomenon is referred to as hysteresis. When heated to a certain temperature called the Curie point, which is generally different for each substance, ferromagnetic materials lose their characteristic properties and cease to be magnetic; however, they become ferromagnetic again on cooling.

The terms "magnetic" and "magnetized" mean being ferromagnetic or ferrimagnetic at 20° C., unless otherwise specified.

The term "magnetizable" means that the item being referred to is magnetic or can be made magnetic using an applied magnetic field, and has a magnetic moment of at least 0.001 electromagnetic units (emu), in some cases at least 0.005 emu, and yet other cases 0.01 emu, up to an including 0.1 emu, although this is not a requirement. The term "magnetizable" means capable of being magnetized or already in a magnetized state.

The term "magnetic field" refers to magnetic fields that are not generated by any astronomical body or bodies (e.g., Earth or the sun). In general, magnetic fields used in practice of the present disclosure have a field strength in the region of the magnetizable abrasive particles being oriented of at least about 10 gauss (1 mT), in some cases at least about 100 gauss (10 mT), and in yet other cases at least about 1000 gauss (0.1 T).

The term "shaped ceramic body" refers to a ceramic body that has been intentionally shaped (e.g., extruded, die cut, molded, screen-printed) at some point during its preparation such that the resulting ceramic body is non-randomly shaped. The term "shaped ceramic body" as used herein excludes ceramic bodies obtained by a mechanical crushing or milling operation.

The terms "precisely-shaped ceramic body" refers to a ceramic body wherein at least a portion of the ceramic body has a predetermined shape that is replicated from a mold cavity used to form a precursor precisely-shaped ceramic body that is sintered to form the precisely-shaped ceramic body. A precisely-shaped ceramic body will generally have a predetermined geometric shape that substantially replicates the mold cavity that was used to form the shaped abrasive particle.

The term "length" refers to the longest dimension a an object.

The term "width" refers to the longest dimension of an object that is perpendicular to its length.

The term "thickness" refers to the longest dimension of an object that is perpendicular to both of its length and width.

The term "aspect ratio" refers to the ratio length/thickness of an object.

The term "orientation", "orient" or "oriented" as it refers to the magnetizable abrasive particles provided by distribution devices and/or the magnetic fields of the present disclosure can refer to a non-random disposition of at least a majority of the particles relative to the distribution device(s) and/or the backing. For example, a majority of the magnetizable abrasive particles have a major planar surface disposed at an angle of at least 70 degrees relative to the first major surface of the backing upon transfer to the backing. These terms also can refer to major axes and dimensions of the magnetizable abrasive particles themselves. For example, the particle maximum length, height and thickness are a function of a shape of the magnetizable abrasive particle, and the shape may or may not be uniform. The present disclosure is in no way limited to any particular abrasive particle shape, dimensions, type, etc., and many exemplary magnetizable abrasive particles useful with the present disclosure are described in greater detail below. However, with some shapes, the "height", "width" and "thickness" give rise to major faces and minor side faces. Regardless of an exact shape, any magnetizable abrasive particle can have a centroid at which particle Cartesian axes can be defined. With these conventions, the particle z-axis is parallel with the maximum height, the particle y-axis is parallel with the maximum length, and the particle x-axis is parallel with the maximum thickness of the particle. As a point of reference, the particle axes can identified for each magnetizable abrasive particle as a standalone object independent of the backing construction; once applied to the backing, a "z-axis rotation orientation" of the magnetizable abrasive particle is defined by the particle's angular rotation about a z-axis passing through the particle and through the backing to which the particle is attached at a 90 degree angle to the backing. The orientation effected by the distribution devices of the present disclosure entail dictating or limiting a spatial arrangement of the abrasive particle to a range of rotational orientations about the particle in one or more of the z-axis, the y-axis and/or the x-axis to a range of rotational orientations about the particle axes.

The term "alignment" "aligned" or "align" as it refers to the magnetizable abrasive particles provided by distribution tools and/or the magnetic fields of the present disclosure can refer to a non-random positioning of at least a majority of the magnetizable abrasive particles. Such alignment can position a majority of the magnetizable abrasive particles such that a majority of the magnetizable abrasive particles have major surfaces that are substantially parallel with one another and/or perpendicular to a common axis of a tool. In some cases such alignment can position at least the majority of the magnetizable abrasive particles with a minor surface/cutting edge(s) that is positioned in a direction of cutting when the abrasive article is used.

The term "substantially" means within 35 percent (within 30 percent, in yet other cases within 25 percent, in yet other cases within 20 percent, in yet other cases within 10 percent, and in yet other cases within 5 percent) of the attribute being referred to.

Features and advantages of the present disclosure will be further understood upon consideration of the detailed description as well as the appended claims.

This overview is intended to provide an overview of subject matter of the present patent application. It is not intended to provide an exclusive or exhaustive explanation of the invention. The detailed description is included to provide further information about the present patent application.

DETAILED DESCRIPTION

Magnetizable abrasive particles are described herein by way of example and can have various configurations. For example, the magnetizable abrasive particles can be constructed of various materials including but not limited to ceramics, metal alloys, composites or the like. Similarly, the magnetizable abrasive particles can be substantially entirely constructed of magnetizable material, can have magnetizable portions disposed therein (e.g., ferrous traces), or can have magnetizable portions disposed as layers on one or more surfaces thereof (e.g., one or more surfaces can be coated with a magnetizable material) according to some examples. The magnetizable abrasive particles can be shaped according to some examples. According to other examples the magnetizable abrasive particles can comprise crush grains, agglomerates, or the like. Magnetizable abrasive particles can be used in loose form (e.g., free-flowing or in a slurry) or they can be incorporated into various abrasive articles (e.g., coated abrasive articles, bonded abrasive articles, nonwoven abrasive articles, and/or abrasive brushes).

Figure 1:
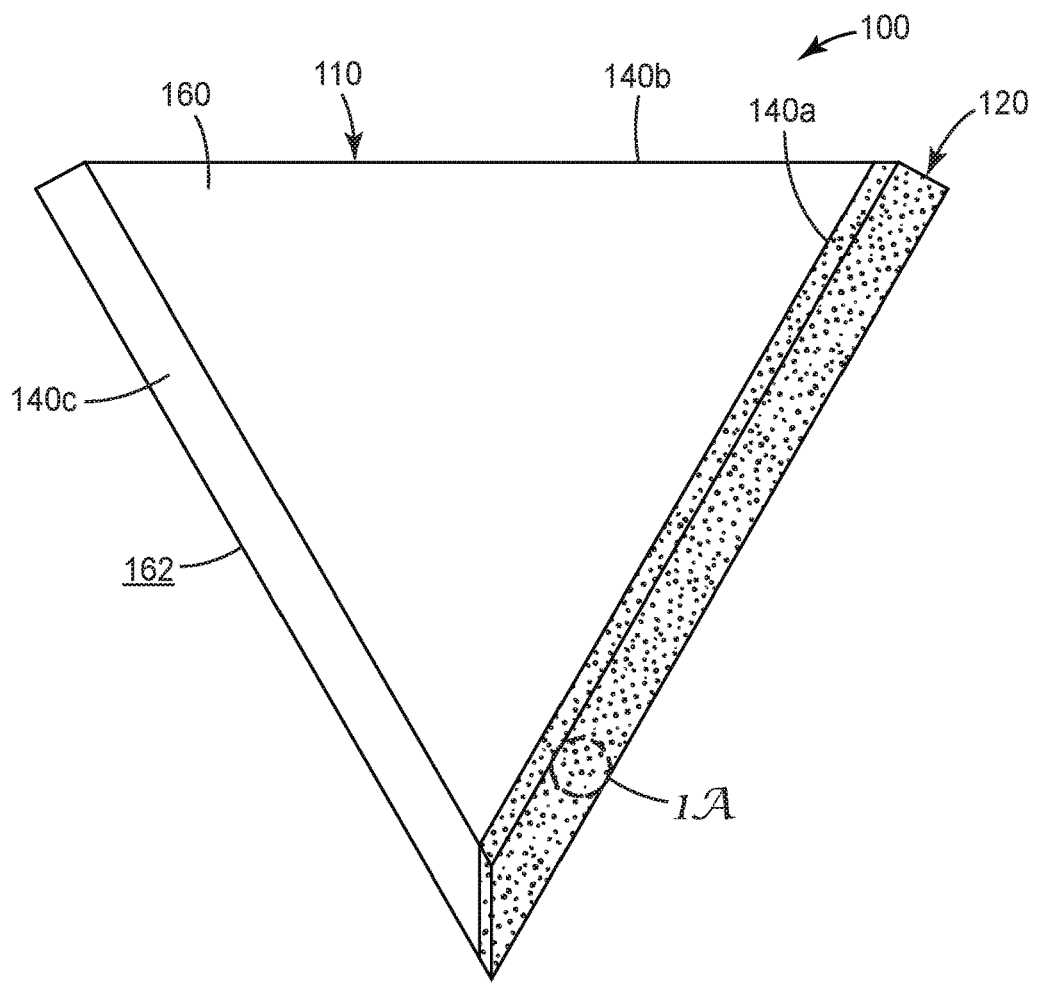
FIG. 1 is a schematic perspective view of an exemplary magnetizable abrasive particle according to one embodiment of the present disclosure.
Figure 1A:
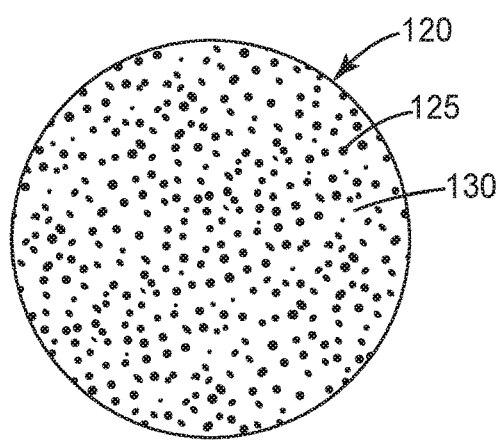
FIG. 1A is an enlarged view of region 1A in FIG. 1.

Referring now to FIGS. 1 and 1A, an exemplary magnetizable abrasive particle 100 is disclosed. The magnetizable abrasive particle 100 can have a shaped ceramic body 110 and magnetizable layer 120. The magnetizable layer 120 can be comprised of magnetizable particles 125 retained in a binder matrix 130 (also referred to simply as "binder") as further shown in FIG. 1A. The shaped ceramic body 110 can have two opposed major surfaces 160, 162 connected to each other by three side surfaces 140a, 140b, 140c. The magnetizable layer 120 is disposed on side surface 140a of ceramic body 110.

The magnetizable layer 120 can optionally extend somewhat onto other surfaces of the shaped ceramic body 110. In some embodiments, the magnetizable layer 120 can extend to cover a majority of any surface of the shaped ceramic body 110 as desired. As shown, magnetizable layer 120 can be coextensive with side surface 140a. Magnetizable abrasive particles of the type shown can be aligned with the magnetizable layer-coated surface parallel to magnetic field lines of force as will be discussed subsequently.

In general, since orientation of the magnetic field lines tends to be different at the center and edge of a magnet it is also possible to create various desired orientations of the magnetizable abrasive particles during their inclusion into an abrasive article.

The magnetizable layer can be a unitary magnetizable material, or it can comprise magnetizable particles in a binder matrix. Suitable binders can be vitreous or organic, for example, as described for the binder matrix 130 hereinbelow. The binder matrix can be, for example selected from those vitreous and organic binders. The ceramic body can comprise any ceramic material (a ceramic abrasive material), for example, selected from among the ceramic (i.e., not including diamond) abrasive materials listed hereinbelow. The magnetizable layer can be disposed on the ceramic body by any suitable method such as, for example, dip coating, spraying, painting, physical vapor deposition, and powder coating. Individual magnetizable abrasive particles can have magnetizable layers with different degrees of coverage and/or locations of coverage. The magnetizable layer can be essentially free of (i.e., containing less than 5 weight percent of, in yet other cases containing less than 1 weight percent of) ceramic abrasive materials used in the ceramic body.

The magnetizable layer can consist essentially of magnetizable materials (e.g., >99 to 100 percent by weight of vapor coated metals and alloys thereof), or it can contain magnetizable particles retained in a binder matrix. The binder matrix of the magnetizable layer, if present, can be inorganic (e.g., vitreous) or organic resin-based, and is typically formed from a respective binder precursor.

Magnetizable abrasive particles according to the present disclosure can be prepared, for example, by applying a magnetizable layer or precursor thereof to the ceramic body. Magnetizable layers can be provided by physical vapor deposition as discussed hereinbelow. Magnetizable layer precursors can be provided as a dispersion or slurry in a liquid vehicle. The dispersion or slurry vehicle and can be made by simple mixing of its components (e.g., magnetizable particles, optional binder precursor, and liquid vehicle), for example. Exemplary liquid vehicles include water, alcohols (e.g., methanol, ethanol, propanol, butanol, ethylene glycol monomethyl ether), ethers (e.g., glyme, diglyme), and combinations thereof. The dispersion or slurry can contain additional components such as, for example, dispersant, surfactant, mold release agent, colorant, defoamer, and rheology modifier. Typically, after coating onto the ceramic bodies the magnetizable layer precursor is dried to remove most or all of the liquid vehicle, although this is not a requirement. If a curable binder precursor is used, then a curing step (e.g., heating and/or exposure to actinic radiation) generally follows to provide the magnetizable layer.

Vitreous binder can be produced from a precursor composition comprising a mixture or combination of one or more raw materials that when heated to a high temperature melt and/or fuse to form a vitreous binder matrix. Further disclosure of appropriate vitreous binders that can be used with the abrasive article can be found in U.S. Provisional Pat. Appl. Ser. Nos. 62/412,402, 62/412,405, 62/412,411, 62/412,416, 62/412,427, 62/412,440, 62/412,459, and 62/412,470, which are each incorporated herein by reference in their entirety.

In some embodiments, the magnetizable layer can be deposited using a vapor deposition technique such as, for example, physical vapor deposition (PVD) including magnetron sputtering. PVD metallization of various metals, metal oxides and metallic alloys is disclosed in, for example, U.S. Pat. No. 4,612,242 (Vesley) and U.S. Pat. No. 7,727,931 (Brey et al.). Magnetizable layers can typically be prepared in this general manner, but care should be generally taken to prevent the vapor coating from covering the entire surface of the shaped ceramic body. The can be accomplished by masking a portion of the ceramic body to prevent vapor deposition.

Examples of metallic materials that can be vapor coated include stainless steels, nickel, cobalt. Exemplary useful magnetizable particles/materials can comprise: iron; cobalt; nickel; various alloys of nickel and iron marketed as Permalloy in various grades; various alloys of iron, nickel and cobalt marketed as Fernico, Kovar, FerNiCo I, or FerNiCo II; various alloys of iron, aluminum, nickel, cobalt, and sometimes also copper and/or titanium marketed as Alnico in various grades; alloys of iron, silicon, and aluminum (typically about 85:9:6 by weight) marketed as Sendust alloy; Heusler alloys (e.g., $Cu_2MnSn$); manganese bismuthide (also known as Bismanol); rare earth magnetizable materials such as gadolinium, dysprosium, holmium, europium oxide, and alloys of samarium and cobalt (e.g., $SmCo_5$); MnSb; ferrites such as ferrite, magnetite; zinc ferrite; nickel ferrite; cobalt ferrite, magnesium ferrite, barium ferrite, and strontium ferrite; and combinations of the foregoing. In some embodiments, the magnetizable material comprises at least one metal selected from iron, nickel, and cobalt, an alloy of two or more such metals, or an alloy of at one such metal with at least one element selected from phosphorus and manganese. In some embodiments, the magnetizable material is an alloy containing 8 to 12 weight percent (wt. %) aluminum, 15 to 26 wt. % nickel, 5 to 24 wt. % cobalt, up to 6 wt. % copper, up to 1 wt. % titanium, wherein the balance of material to add up to 100 wt. % is iron. Alloys of this type are available under the trade designation "ALNICO".

Useful abrasive materials that can be used as ceramic bodies include, for example, fused aluminum oxide, heat treated aluminum oxide, white fused aluminum oxide, ceramic aluminum oxide materials such as those commercially available as 3M CERAMIC ABRASIVE GRAIN from 3M Company of St. Paul, Minn., black silicon carbide, green silicon carbide, titanium diboride, boron carbide, tungsten carbide, titanium carbide, cubic boron nitride, garnet, fused alumina zirconia, sol-gel derived ceramics (e.g., alumina ceramics doped with chromia, ceria, zirconia, titania, silica, and/or tin oxide), silica (e.g., quartz, glass beads, glass bubbles and glass fibers), feldspar, or flint. Examples of sol-gel derived crushed ceramic particles can be found in U.S. Pat. No. 4,314,827 (Leitheiser et al.), U.S. Pat. No. 4,623,364 (Cottringer et al.); U.S. Pat. No. 4,744,802 (Schwabel), U.S. Pat. No. 4,770,671 (Monroe et al.); and U.S. Pat. No. 4,881,951 (Monroe et al.).

As discussed previously, the body of the abrasive particle can be shaped (e.g., precisely-shaped) or random (e.g., crushed). Shaped abrasive particles and precisely-shaped ceramic bodies can be prepared by a molding process using sol-gel technology as described in U.S. Pat. No. 5,201,916 (Berg); U.S. Pat. No. 5,366,523 (Rowenhorst (Re 35,570)); and U.S. Pat. No. 5,984,988 (Berg). U.S. Pat. No. 8,034,137 (Erickson et al.) describes alumina particles that have been formed in a specific shape, then crushed to form shards that retain a portion of their original shape features. In some embodiments, the ceramic bodies are precisely-shaped (i.e., the ceramic bodies have shapes that are at least partially determined by the shapes of cavities in a production tool used to make them).

Exemplary shapes of ceramic bodies include crushed, pyramids (e.g., 3-, 4-, 5-, or 6-sided pyramids), truncated pyramids (e.g., 3-, 4-, 5-, or 6-sided truncated pyramids), cones, truncated cones, rods (e.g., cylindrical, vermiform), and prisms (e.g., 3-, 4-, 5-, or 6-sided prisms).

Exemplary magnetizable materials that can be suitable for use in magnetizable particles can comprise: iron; cobalt; nickel; various alloys of nickel and iron marketed as Permalloy in various grades; various alloys of iron, nickel and cobalt marketed as Fernico, Kovar, FerNiCo I, or FerNiCo II; various alloys of iron, aluminum, nickel, cobalt, and sometimes also copper and/or titanium marketed as Alnico in various grades; alloys of iron, silicon, and aluminum (typically about 85:9:6 by weight) marketed as Sendust alloy; Heusler alloys (e.g., $Cu_2MnSn$); manganese bismuthide (also known as Bismanol); rare earth magnetizable materials such as gadolinium, dysprosium, holmium, europium oxide, alloys of neodymium, iron and boron (e.g., $Nd_2Fe_{14}B$), and alloys of samarium and cobalt (e.g., $SmCo_5$); MnSb; $MnOFe_2O_3$; $Y_3Fe_5O_{12}$; $CrO_2$; MnAs; ferrites such as ferrite, magnetite; zinc ferrite; nickel ferrite; cobalt ferrite, magnesium ferrite, barium ferrite, and strontium ferrite; yttrium iron garnet; and combinations of the foregoing. In some embodiments, the magnetizable material comprises at least one metal selected from iron, nickel, and cobalt, an alloy of two or more such metals, or an alloy of at one such metal with at least one element selected from phosphorus and manganese. In some embodiments, the magnetizable material is an alloy (e.g., Alnico alloy) containing 8 to 12 weight percent (wt. %) aluminum, 15 to 26 wt. % nickel, 5 to 24 wt. % cobalt, up to 6 wt. % copper, up to 1 wt. % titanium, wherein the balance of material to add up to 100 wt. % is iron.

The magnetizable abrasive particles can have any size, but can be much smaller than the ceramic bodies as judged by average particle diameter, in yet other cases 4 to 2000 times smaller, in yet other cases 100 to 2000 times smaller, and in yet other cases 500 to 2000 times smaller, although other sizes can also be used. In this embodiment, the magnetizable particles can have a Mohs hardness of 6 or less (e.g., 5 or less, or 4 or less), although this is not a requirement.

Figure 2:
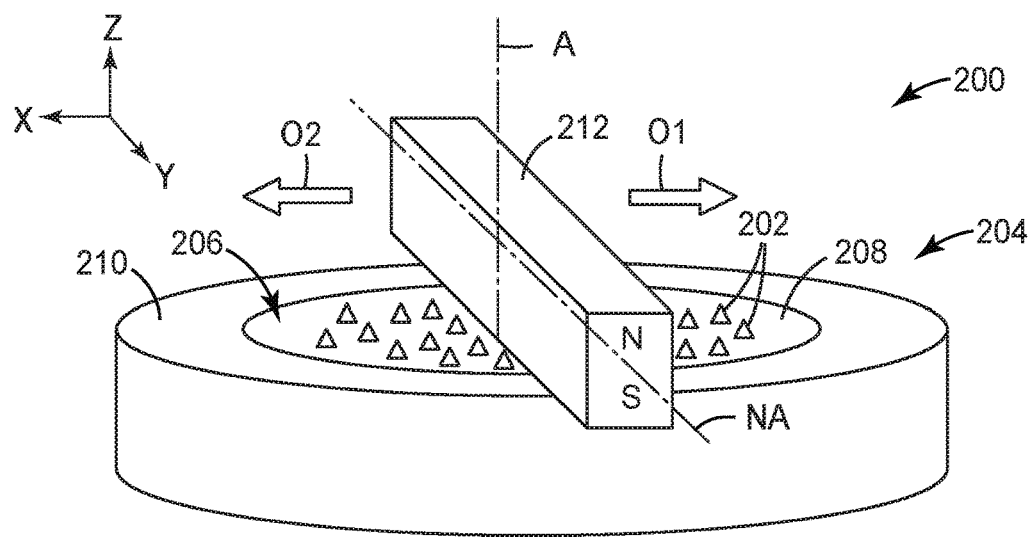
FIG. 2 is schematic view of a first embodiment of a method that varies magnetic field by moving a magnet in an oscillatory manner relative to magnetizable abrasive particles to orient and/or align the magnetizable abrasive particles as desired according to an example of the present disclosure.

FIG. 2 shows a method 200 for making abrasive articles according to one embodiment of the present disclosure. The method 200 is operable to provide magnetizable abrasive particles 202 a desired orientation within a mold 204, and subsequently, a desired orientation within an abrasive article formed using the mold 204.

The magnetizable abrasive articles 202 can have a construction similar to those previously illustrated and described. These magnetizable abrasive particles 202 can be disposed within a mold cavity 206 by hand or a distribution device (not shown) for example. The mold cavity 206 and mold 204 can be symmetrically shaped such about axis A and can have a base surface 208 upon which the magnetizable abrasive particles 202 rest and a sidewall 210. In some cases, one or more portions of the mold 204 including the base surface 208 can be comprised of a magnetizable material such as a ferrous metal.

A magnet 212 (permanent or electromagnet) can be placed in close proximity (within a few feet) of the mold 204 and the magnetizable abrasive articles 202. A Cartesian coordinate system is provided to aid in understanding the positioning of the mold 204 and the magnet 212. According to the embodiment shown, the Cartesian coordinate system provided can have an axis (y-axis) that substantially aligns with a neutral axis NA (a non-polar position) of the magnet 212. One or more axes (x-axis, y-axis, and/or z-axis) of the Cartesian coordinate system can also be oriented parallel to features of the mold 204 such as the base surface 208.

Examples of magnetic field configurations and apparatuses for generating them are described in U.S. Patent Application. Publication. Nos. 2008/0289262 A1 (Gao) and U.S. Pat. No. 2,370,636 (Carlton), U.S. Pat. No. 2,857,879 (Johnson), U.S. Pat. No. 3,625,666 (James), U.S. Pat. No. 4,008,055 (Phaal), U.S. Pat. No. 5,181,939 (Neff), and British Pat. No. (G. B.) 1 477 767 (Edenville Engineering Works Limited), which are each incorporated herein by reference in their entirety.

According to the example embodiment, the magnet 212 is positioned to extend across a diameter of the mold cavity 206 in the y-axis direction of the Cartesian coordinate system provided. The magnet 212 can be positioned symmetrically above the mold 204 so as to bisected by the axis A and create substantially equally sized portions. The magnet 212 can be moved across the diameter of the mold cavity 206 in a second direction such as in the x-axis direction of the Cartesian coordinate system provided. More particularly, the magnet 212 can be moved in an oscillatory manner as indicated by arrows O1 and O2 back-and-forth across the diameter of the mold cavity 206. During this process the position of the magnet 212 in the z-axis direction of the Cartesian coordinate system can be substantially maintained (i.e. is not varied substantially). However, in other embodiments, the position of the magnet 212 can be varied in one or more additional directions in addition to the x-axis direction. For example, the position of the magnet 212 could be varied in the z-axis direction and the x-axis direction, the y-axis direction and the x-axis direction or in the z-axis direction, the y-axis direction, and the x-axis direction. Items such as the orientation of features of the mold 204 and the orientation of the magnet 212 may not align with the Cartesian coordinate system provided in all embodiments. The Cartesian coordinate system is provided in the exemplary embodiment to aid in the understanding of the viewer.

Figure 2A:
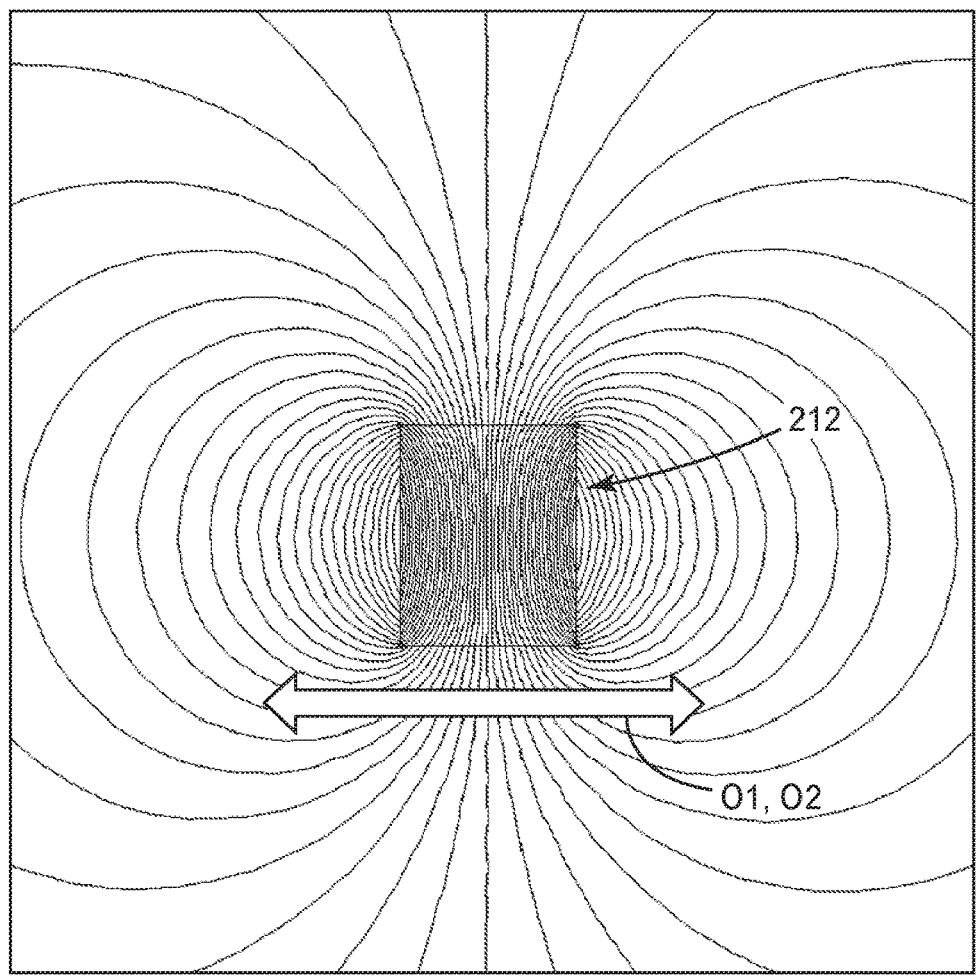
FIG. 2A shows a plot of the field lines illustrating the relative strength of the magnetic field as well as an arrow showing a direction of movement of the magnetic field of the embodiment of FIG. 2 according to an example of the present disclosure.

The magnet 212 subjects the magnetizable abrasive particles 202 and the mold 204 to a magnetic field. FIG. 2A shows a plot of the magnet field lines of the magnetic field. As shown in FIG. 2A the strength and/or angle of the magnetic field varies with distance from the magnet 212 and position relative to one of the poles of the magnet 212. As the magnet 212 is oscillated as indicated by arrow O1, O2, the strength and/or angle of the magnetic field relative to each of the magnetizable abrasive particles 202 (FIG. 2) is varied. As the position of each of the magnetizable abrasive particles 202 is fixed in the x-axis and z-axis directions, the magnetic field becomes relatively stronger relative to an individual one of the magnetizable abrasive particles 202 as the magnet 212 is moved into closer proximity thereto and becomes relatively weaker as the magnet 212 is moved a further distance away (e.g., along the x-axis shown in FIG. 2). Thus, FIGS. 2 and 2A illustrate one embodiment by which the magnetic field can be varied relative to the magnetizable abrasive particles (i.e. by relative movement between the magnet and the magnetizable abrasive particles). Other methods by which the magnetic field experienced by the magnetizable abrasive particles can be varied include, for example, changing the polarity of the magnet, changing the orientation of the polarity of the magnet, increasing or decreasing the field strength (the magnetic force) applied by the magnet, and adding one or more additional magnets to apply additional magnetic fields.

As is further discussed and illustrated in the Examples and Comparative Examples, the present inventors have discovered that by varying the magnetic field relative to the magnetizable abrasive particles, a non-random orientation can be imparted to the magnetizable abrasive particles. For example, with sufficient variation of the magnetic field due to oscillation of the magnet 212, a majority of the magnetizable abrasive particles 202 can have a major planar surface (160 or 162 of FIG. 1) disposed at an angle of at least 70 degrees relative to the base surface 208. This orientation positions a majority of the magnetizable abrasive particles 202 to rest on the base surface 208 point upward to create a more effective abrasive article.

The method described herein can be used as part of a batch or continuous process. The method 200 can be used to make an abrasive article according to the following exemplary steps: providing a surface (e.g., base surface 208), disposing magnetizable abrasive particles on the surface, and varying a magnetic field relative to the magnetizable abrasive particles to impart a non-random orientation of the magnetizable abrasive particles relative to the surface.

The remaining FIGS. 3-7A describe various alternative embodiments that utilize the mold 204 and the magnetizable abrasive particles 202 as previously described. The magnets described can have a similar or identical construction to that magnet 212 but can be altered in orientation or type of movement relative to the mold 204 and the magnetizable abrasive particles 202. To distinguish the embodiments and avoid confusion for the reader, each magnet will be described with a new reference number.

Figure 3:
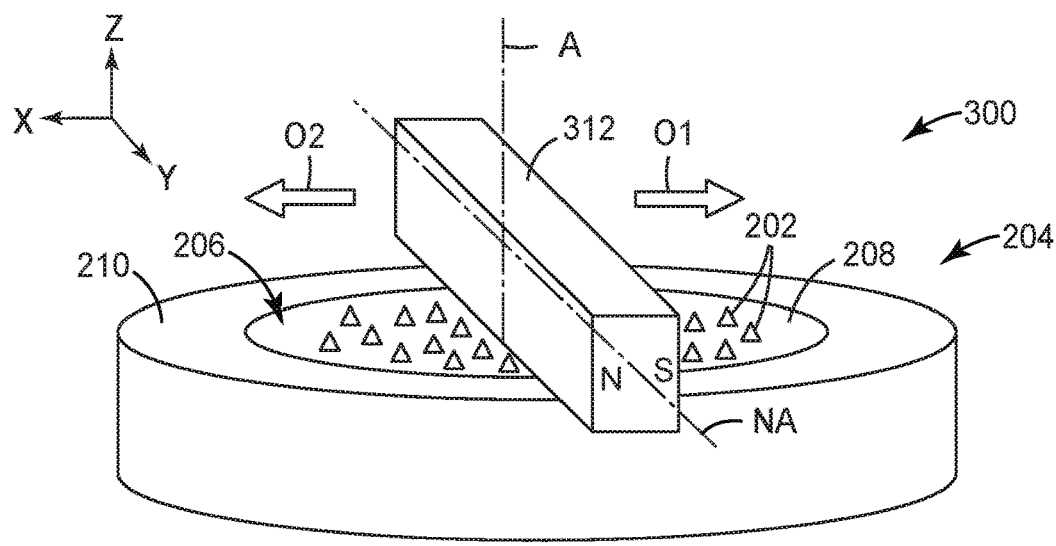
FIG. 3 is schematic view of a second embodiment of a method that varies magnetic field by moving a magnet in an oscillatory manner relative to the magnetizable abrasive particles to orient and/or align the magnetizable abrasive particles as desired according to an example of the present disclosure.
Figure 3A:
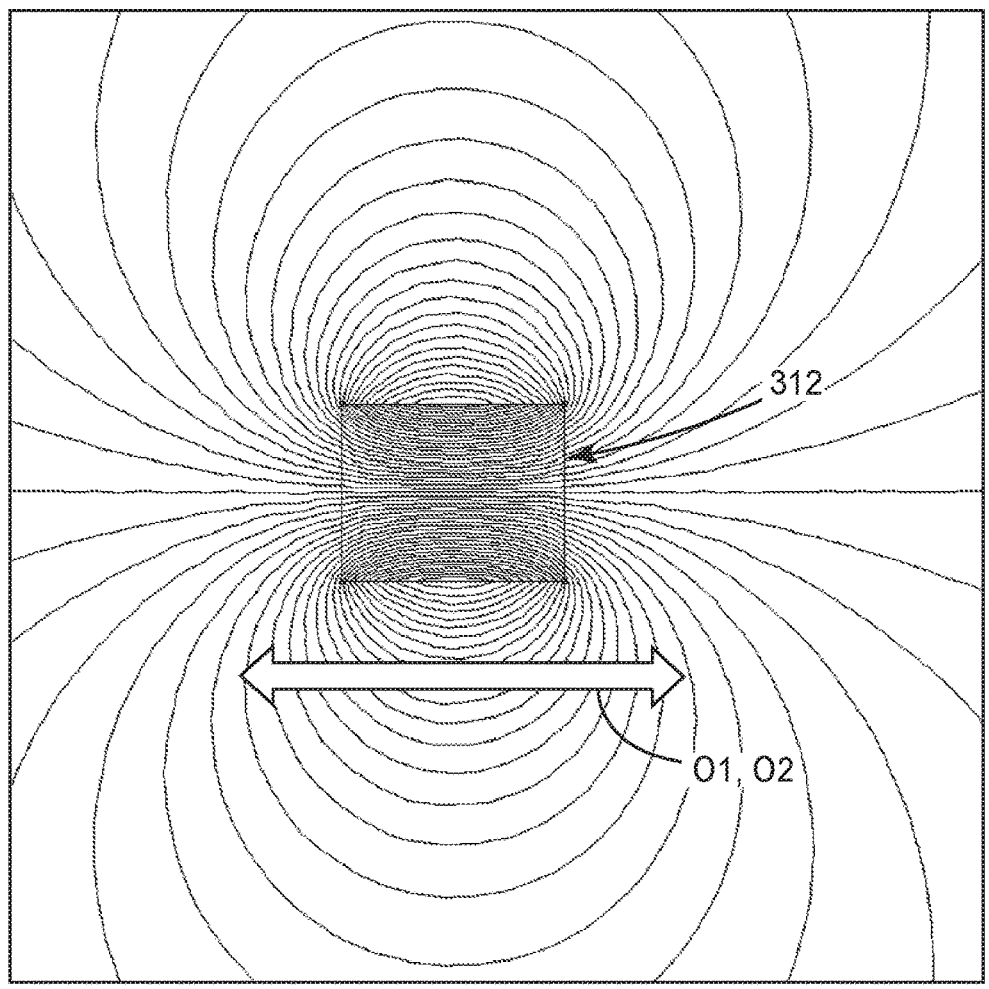
FIG. 3A shows a plot of the field lines illustrating the relative strength of the magnetic field as well as an arrow showing a direction of movement of the magnetic field of the embodiment of FIG. 3 according to an example of the present disclosure.

FIG. 3 illustrates a method 300 similar to that of the method 200 save that the orientation of the poles of the magnet 312 has been repositioned 90 degrees relative to the position of the poles shown in the embodiment of FIG. 2. The method 300 oscillates the magnet 312 as indicated by arrows O1 and O2 back-and-forth across the diameter of the mold cavity 206. As shown in FIG. 3A the strength of the magnetic field varies with distance from the magnet 312 and position relative to one of the poles of the magnet 312. As the magnet 312 is oscillated as indicated by arrow O1, O2, the strength and/or angle of the magnetic field relative to each of the magnetizable abrasive particles 202 (FIG. 3) is varied.

Figure 4:
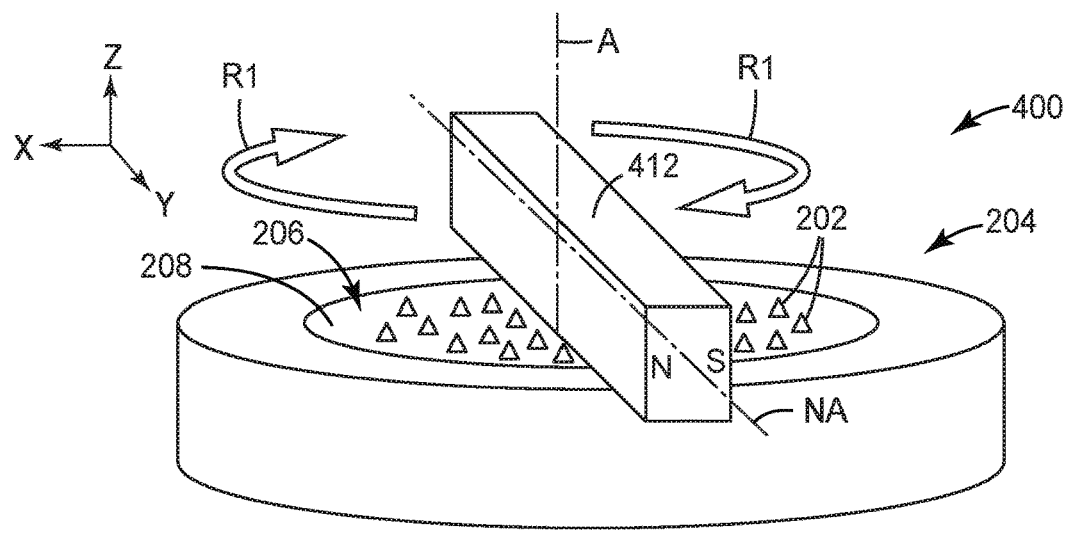
FIG. 4 is schematic view of a third embodiment of a method that varies magnetic field by rotating a magnet about a first axis relative to the magnetizable abrasive particles to orient and/or align the magnetizable abrasive particles as desired according to an example of the present disclosure.
Figure 5:
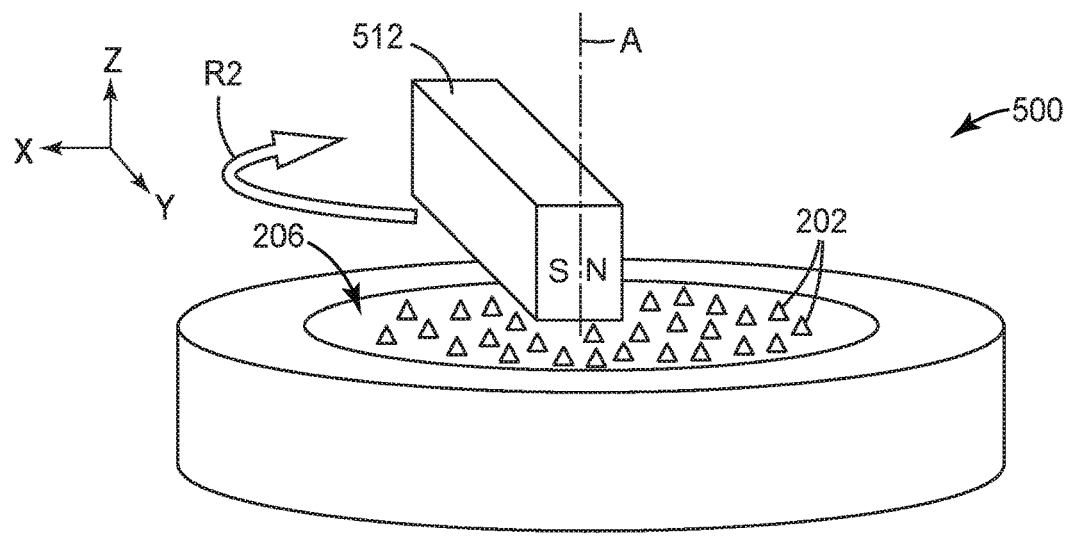
FIG. 5 is schematic view of a fourth embodiment of a method that varies magnetic field by offsetting and rotating a magnet about the first axis relative to the magnetizable abrasive particles to orient and/or align the magnetizable abrasive particles as desired according to an example of the present disclosure.
Figure 5A:
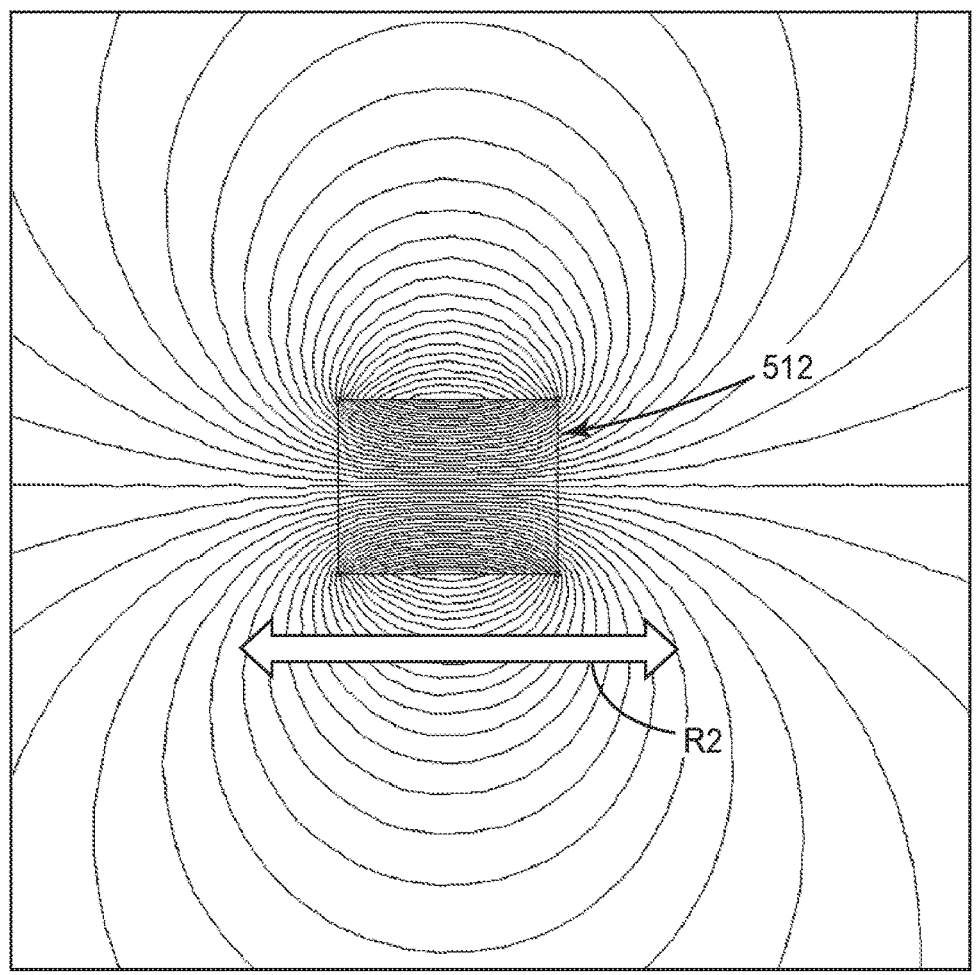
FIG. 5A shows a plot of the field lines illustrating the relative strength of the magnetic field as well as an arrow showing a direction of movement of the magnetic field of the embodiment of FIG. 5 according to an example of the present disclosure.

FIGS. 4-5A show that a magnet can be rotated about a first axis relative to the magnetizable abrasive particles 202 to vary the magnetic field, and thereby, orient the magnetizable abrasive particles 202 as desired. FIG. 4 shows a method 400 with a magnet 412 (permanent or electromagnet) that is placed in close proximity (within a few feet) of the mold 204 and the magnetizable abrasive articles 202. According to the embodiment shown, the Cartesian coordinate system provided can have an axis (y-axis) that substantially aligns with a neutral axis NA (a non-polar position) of the magnet 412. One or more axes (x-axis, y-axis, and/or z-axis) of the Cartesian coordinate system can be oriented parallel to features of the mold 204 such as the base surface 208.

According to the embodiment of FIG. 4, the magnet 412 is positioned to extend across a diameter of the mold cavity 206. The magnet 412 can be positioned symmetrically above the mold 204 so as to bisected by the axis A and create substantially equally sized portions. The magnet 412 can be rotated about the axis A such as about the z-axis direction of the Cartesian coordinate system provided as indicated by arrows R1. During this process, the position of the magnet 412 in the z-axis direction of the Cartesian coordinate system can be substantially maintained (i.e. is not varied to a great degree). However, in other embodiments, the position of the magnet 412 can be varied in one or more additional directions in addition to the x-axis direction as was previously discussed with regard to the embodiment of FIG. 2. Items such as the orientation of features of the mold 204 and the orientation of the magnet 412 may not align with the Cartesian coordinate system provided in all embodiments. The Cartesian coordinate system is provided in the discussed embodiment to aid in the understanding of the viewer.

Figure 4A:
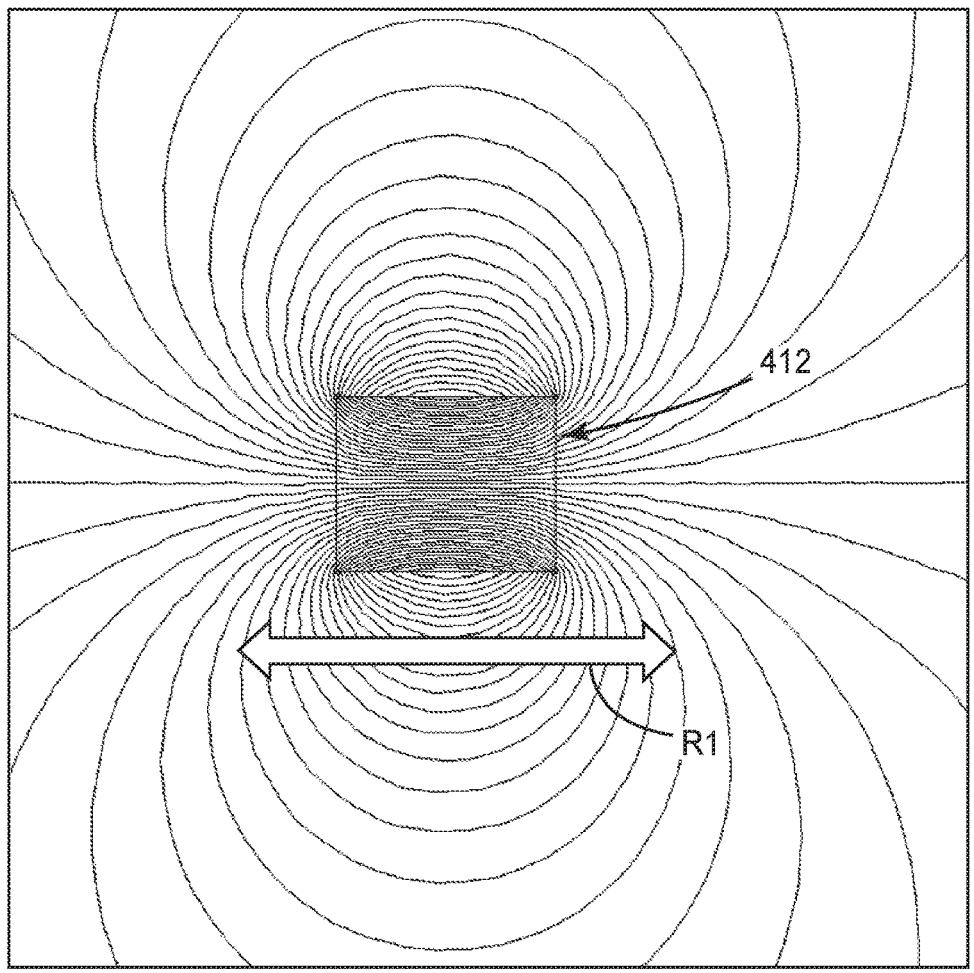
FIG. 4A shows a plot of the field lines illustrating the relative strength of the magnetic field as well as an arrow showing a direction of movement of the magnetic field of the embodiment of FIG. 4 according to an example of the present disclosure.

The magnet 412 subjects the magnetizable abrasive particles 202 and the mold 204 to a magnetic field. FIG. 4A shows a plot of the magnet field lines of the magnetic field. As shown in FIG. 4A the strength of the magnetic field varies with distance from the magnet 412 and position relative to one of the poles of the magnet 412. As the magnet 412 is rotated as indicated by arrow R1, the strength and/or angle of the magnetic field relative to each of the magnetizable abrasive particles 202 (FIG. 4) is varied. As the position of each of the magnetizable abrasive particles 202 is fixed in the x-axis and z-axis directions, the magnetic field becomes relatively stronger relative to an individual one of the magnetizable abrasive particles 202 as the magnet 412 is moved into closer proximity thereto and becomes relatively weaker as the magnet 412 is moved a further distance away. Thus, FIGS. 4 and 4A illustrate another embodiment by which the magnetic field can be varied relative to the magnetizable abrasive particles (i.e. by relative movement between the magnet and the magnetizable abrasive particles).

FIG. 5 shows an alternative method 500 that also rotates a magnet 512 in a similar manner to the method 400 of FIG. 4 save that the magnet 512 is offset from the axis A. Thus, the magnet 512 is positioned over less than the diameter of the mold cavity 206 such as a distance amounting to a radius of the mold cavity 206. The method 500 rotates the magnet 512 as indicated by arrow R2 about the axis A (about the z-axis direction of the Cartesian coordinate system provided). As shown in FIG. 5A the strength and/or angle of the magnetic field varies with distance from the magnet 512 and position relative to one of the poles of the magnet 512. As the magnet 512 is rotated as indicated by arrow R2, the strength and/or angle of the magnetic field relative to each of the magnetizable abrasive particles 202 (FIG. 5) is varied.

Figure 6:
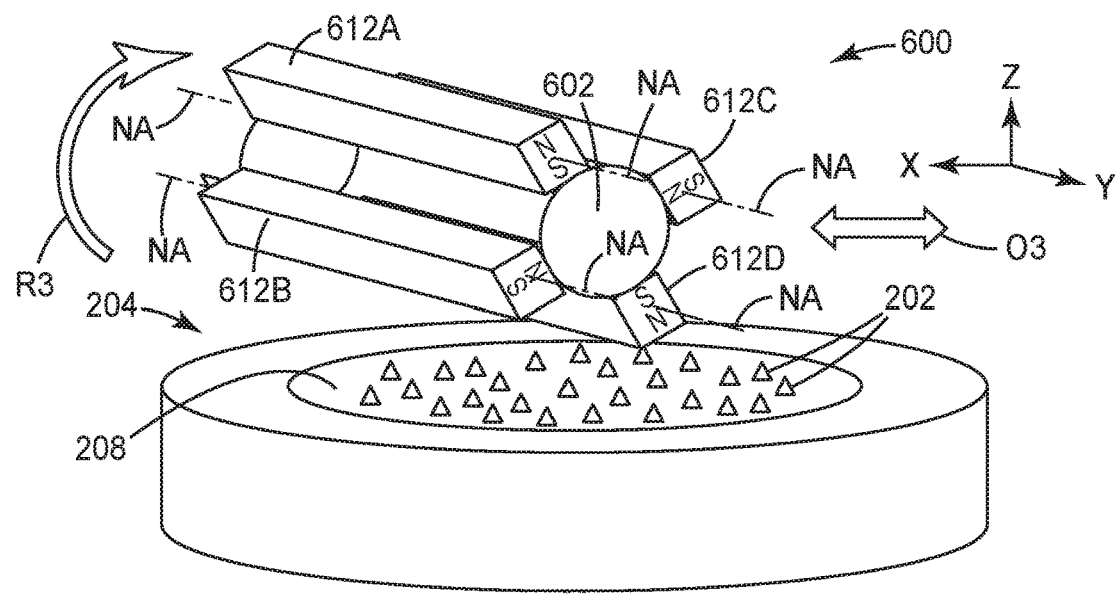
FIG. 6 is schematic view of a fifth embodiment of a method that varies magnetic field by rotating a plurality of magnets about a second axis and oscillating the plurality of magnets relative to the magnetizable abrasive particles to orient and/or align the magnetizable abrasive particles as desired according to an example of the present disclosure.
Figure 7:
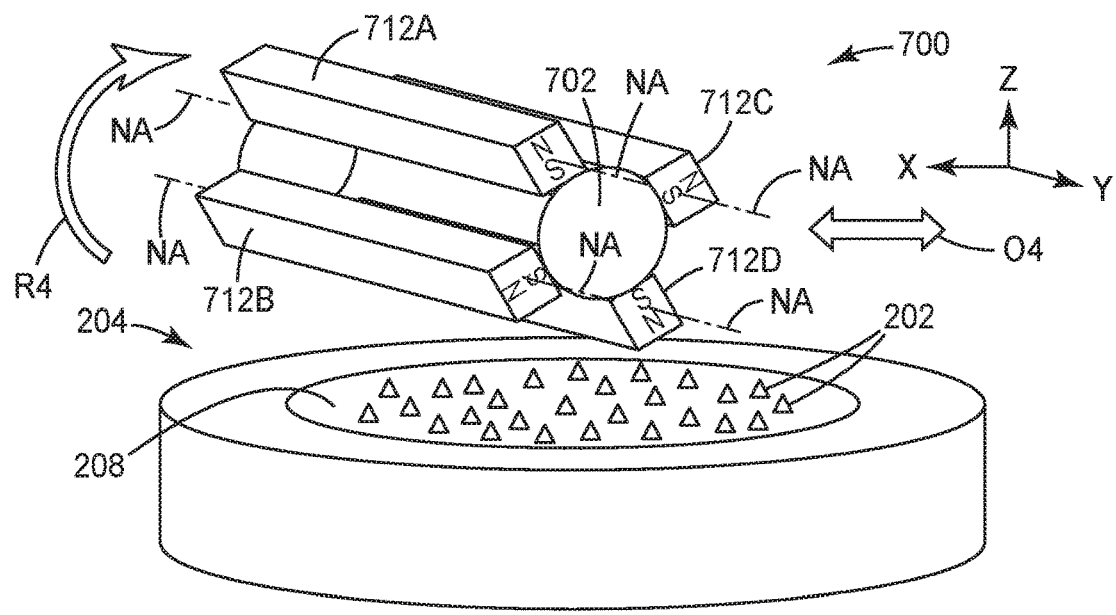
FIG. 7 is schematic view of a sixth embodiment of a method that varies magnetic field by rotating a plurality of magnets about a second axis, oscillating the plurality of magnets relative to the magnetizable abrasive particles, and alternating the polarity of the magnets to orient and/or align magnetizable abrasive particles according to an example of the present disclosure.
Figure 7A:
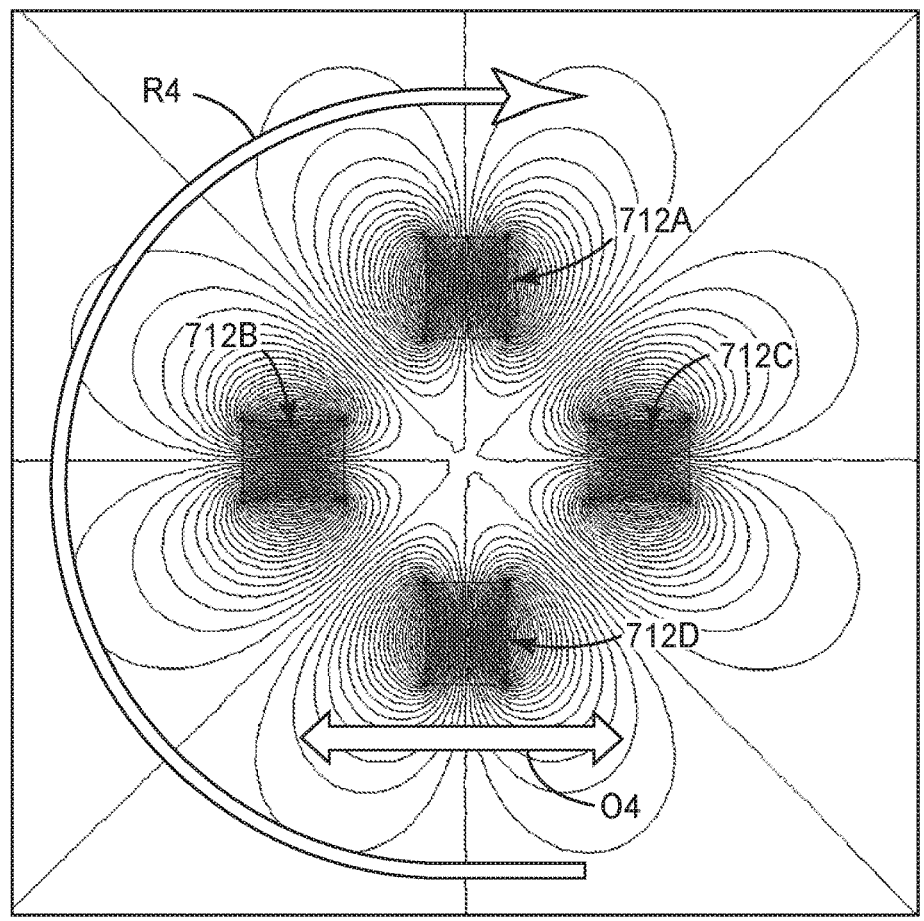
FIG. 7A shows a plot of the field lines illustrating the relative strength of the magnetic field as well as an arrow showing a direction of movement of the magnetic field of the embodiment of FIG. 7 according to an example of the present disclosure.

FIGS. 6-7A show an array of magnets that can be varied in strength, polarity and/or position relative to the magnetizable abrasive particles 202 to vary the magnetic field, and thereby, orient the magnetizable abrasive particles 202 as desired. FIG. 6 shows a method 600 with a plurality of magnets 612A, 612B, 612C and 612D (permanent or electromagnet) that are mounted to a member 602 such as a wheel or disc, for example. The plurality of magnets 612A, 612B, 612C and 612D can rotate together via the member 602 as indicated arrow R3. The method 600 can dispose the plurality of magnets 612A, 612B, 612C and 612D be placed in close proximity (within a few feet) of the mold 204 and the magnetizable abrasive articles 202. According to the embodiment shown, the Cartesian coordinate system provided can have an axis (y-axis) that substantially aligns with a neutral axis NA (a non-polar position extending between the poles) of each of the plurality of magnets 612A, 612B, 612C and 612D. The plurality of magnets 612A, 612B, 612C and 612D can rotate about the y-axis. One or more axes (x-axis, y-axis, and/or z-axis) of the Cartesian coordinate system can be oriented parallel to features of the mold 204 such as the base surface 208.

According to the embodiment of FIG. 6, the plurality of magnets 612A, 612B, 612C and 612D are positioned to extend across a diameter of the mold cavity 206. The plurality of magnets 612A, 612B, 612C and 612D can be oriented in an alternating manner as shown in FIG. 6. Thus, the magnets 612A and 612D have poles (S) that are oriented adjacent the member 602. In contrast, the magnets 612B and 612C have poles (N) that are oriented adjacent the member 602. During rotation R3 of the plurality of magnets 612A, 612B, 612C and 612D, the position of the plurality of magnets 612A, 612B, 612C and 612D in the z-axis direction of the Cartesian coordinate system can be varied by rotation R3 relative to the mold 204 and the magnetizable abrasive particles 202. Additionally, the plurality of magnets 612A, 612B, 612C and 612D positioned relative to the mold 204 can be varied in the x-axis direction in an oscillatory manner as indicated by arrow O3 relative to the mold 204 and the magnetizable abrasive particles 202. Items such as the orientation of features of the mold 204 and the plurality of magnets 612A, 612B, 612C and 612D may not align with the Cartesian coordinate system provided in all embodiments. The Cartesian coordinate system is provided in the discussed embodiment to aid in the understanding of the viewer that the plurality of magnets 612A, 612B, 612C and 612D can be rotated and translated relative to the mold 204 and the magnetizable abrasive particles 202 to vary a magnetic field.

Figure 6A:
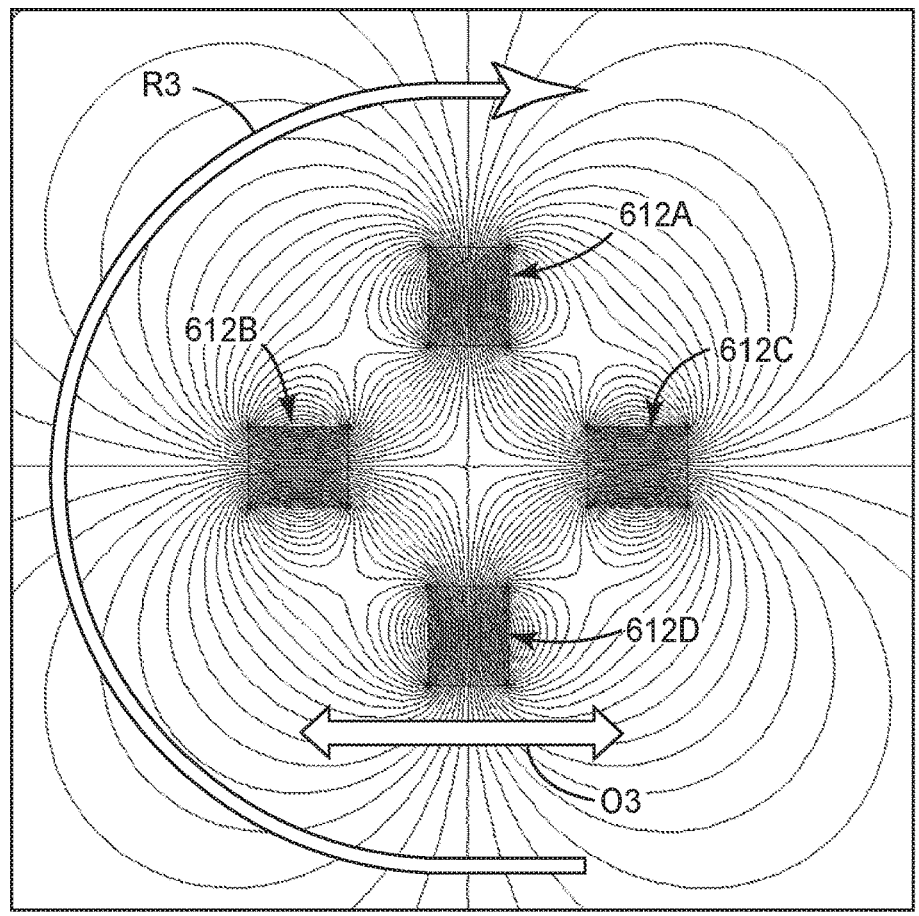
FIG. 6A shows a plot of the field lines illustrating the relative strength of the magnetic field as well as an arrow showing a direction of variation of the magnetic field of the embodiment of FIG. 6 according to an example of the present disclosure.

The plurality of magnets 612A, 612B, 612C and 612D subjects the magnetizable abrasive particles 202 and the mold 204 to the magnetic field. FIG. 6A shows a plot of the magnet field lines of the magnetic field. As shown in FIG.

6A the strength and/or angle of the magnetic field varies with distance from each of plurality of magnets 612A, 612B, 612C and 612D and position relative to one of the poles of each of the plurality of magnets 612A, 612B, 612C and 612D. As the plurality of magnets 612A, 612B, 612C and 612D are rotated as indicated by arrow R3 and oscillated by arrow O3, the strength and/or angle of the magnetic field relative to each of the magnetizable abrasive particles 202 (FIG. 6) is varied. As the position of each of the magnetizable abrasive particles 202 is fixed in the x-axis and z-axis directions, the magnetic field becomes relatively stronger relative to an individual one of the magnetizable abrasive particles 202 as the plurality of magnets 612A, 612B, 612C and 612D are moved into closer proximity thereto and becomes relatively weaker as the plurality of magnets 612A, 612B, 612C and 612D are moved a further distance away. Thus, FIGS. 6 and 6A illustrate another embodiment by which the magnetic field can be varied relative to the magnetizable abrasive particles (i.e. by relative movement between the magnet and the magnetizable abrasive particles and by orientation of the poles of a magnetic assembly to be disposed in an alternating pattern).

FIG. 7 shows an alternative method 700 that also rotates (indicated by arrow R4) and oscillates (indicated by arrow O4) a plurality of magnets 712A, 712B, 712C and 712D relative to the mold 204 and the magnetizable abrasive articles 202. This method 700 can be similar to the method 600 of FIG. 6 save that the plurality of magnets 712A, 712B, 712C and 712D do not have an alternating pole arrangement about a member 702. Thus, the magnets 712A, 712B, 712C and 712D all have a common pole (S) facing the member 702 as shown in FIG. 7. As shown in FIG. 7A the strength and/or angle of the magnetic field varies with distance from the plurality of magnets 712A, 712B, 712C and 712D and position relative to the poles of the plurality of magnets 712A, 712B, 712C and 712D. As the assembly is rotated and oscillated as indicated by arrows R4 and O4, the strength and/or angle of the magnetic field relative to each of the magnetizable abrasive particles 202 (FIG. 7) is varied.

Figure 8:
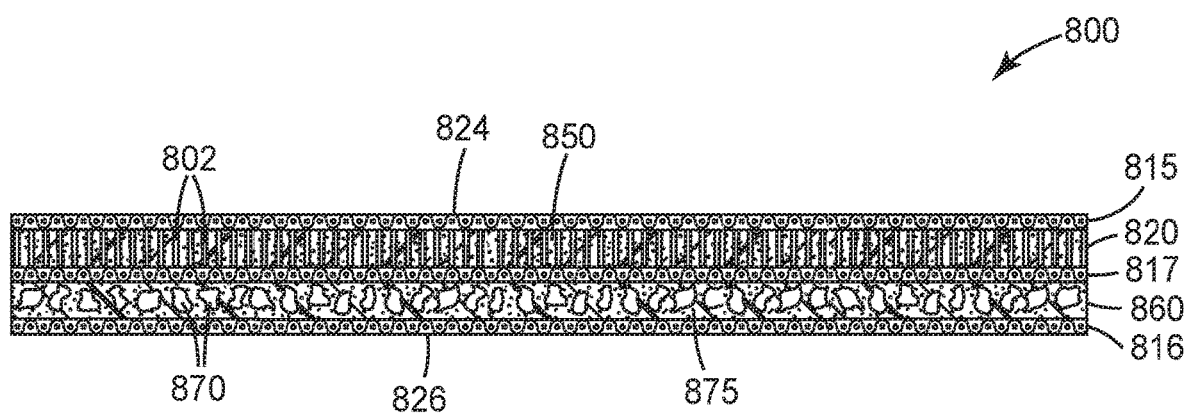
FIG. 8 is a schematic cross-sectional view of a bonded abrasive wheel that utilizes magnetizable abrasive particles according to an example of the present disclosure.

FIG. 8 shows a cross-section of a bonded abrasive article comprising a bonded abrasive wheel 800 that is formed using any one of the methods of FIGS. 2-7A. The bonded abrasive wheel 800 extends from front surface 824 to back surface 826, which can be used, for example, for attachment to a power driven tool (not shown). Primary abrasive layer 820 comprises magnetizable abrasive particles 802 (shown as rods) retained in binder 850. Optional secondary abrasive layer 860 comprises abrasive particles 870 (e.g., crushed abrasive particles retained in binder 875. Primary abrasive layer 820 optionally further comprises primary reinforcing material 815 adjacent to front surface 824 primary abrasive layer 820. Optional secondary abrasive layer 860 optionally further comprises secondary reinforcing material 816 adjacent to back surface 826. Optional reinforcing material 817 is sandwiched between, and/or is disposed at the junction of, primary abrasive layer 820 and secondary abrasive layer 860. In some embodiments, the primary and secondary abrasive layers contact each other, while in other embodiments they a bonded to one another through one or more additional elements (e.g., a layer of a third organic binder optionally including reinforcing material 817).

In some embodiments, more than one (e.g., at least 2, at least 3, at least 4) abrasive layer containing magnetizable abrasive particles may be included in the bonded abrasive wheel. These abrasive layers may be prepared under the same or different magnetic field orientations.

Figure 9:
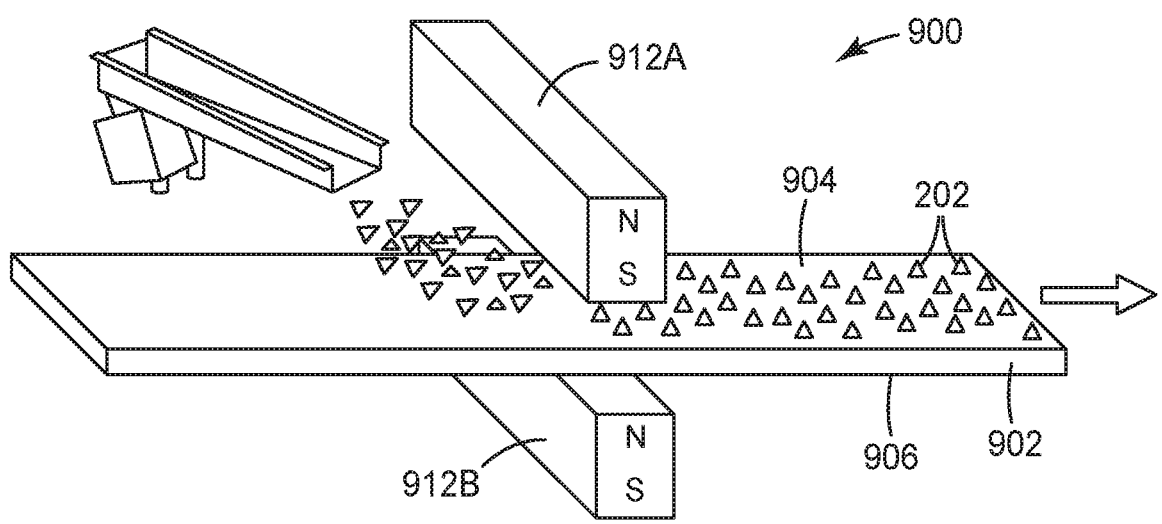
FIG. 9 is a schematic view of a seventh embodiment of a method that varies magnetic field by passing a backing between a first magnet and a second magnet to orient and/or align the magnetizable abrasive particles relative to the backing according to an example of the present disclosure.

FIGS. 9-14 show alternative methods for making a coated abrasive article. The methods of FIGS. 9-14 utilize a surface provided by a first major surface of a backing. Only a portion of the backing is shown in FIGS. 9-14 and the methods disclosed can be part of continuous or batch processes. FIG. 9 shows an embodiment of a method 900 that varies a magnetic field by passing a backing 902 between a first magnet 912A and a second magnet 912B to orient magnetizable abrasive particles 202 relative to the backing 902.

The magnetizable abrasive particles 202 can be disposed on a first major surface 904 of the backing 902 up-web of the first magnet 912A and the second magnet 912B. The backing 902 can also have a second major surface 906 opposing the first major surface 904. The backing 902 can move (as indicated by arrow) relative to the first magnet 912A and the second magnet 912B. The first magnet 912A and the second magnet 912B can be disposed on either side of the major surfaces 904, 906 of the backing 902.

As the backing 902 is translated relative to the first magnet 912A and the second magnet 912B, the strength of the magnetic field relative to each of the magnetizable abrasive particles 202 (FIG. 9) is varied. As the position of each of the magnetizable abrasive particles 202 is changing relative to the first magnet 912A and the second magnet 912B with the backing 902, the magnetic field becomes relatively stronger relative to an individual one of the magnetizable abrasive particles 202 as they are moved into closer proximity to the first magnet 912A and the second magnet 912B and becomes relatively weaker as the magnetizable abrasive particles 202 are moved a further distance away from the first magnet 912A and the second magnet 912B. Thus, FIG. 9 illustrates an embodiment by which the magnetic field can be varied relative to the magnetizable abrasive particles (i.e. by relative movement between the magnet and the magnetizable abrasive particles).

Figure 10:
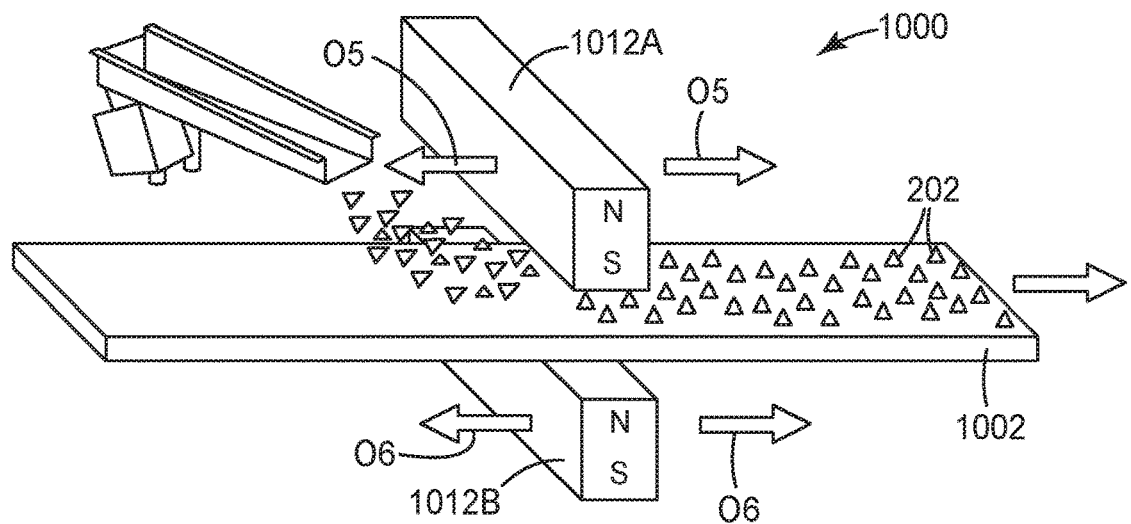
FIG. 10 is a schematic view of an eighth embodiment of a method that varies magnetic field by moving one or both a first magnet and a second magnet in an oscillatory manner relative to a backing and the magnetizable abrasive particles to orient and/or align the magnetizable abrasive particles relative to the backing according to an example of the present disclosure.
Figure 10A:
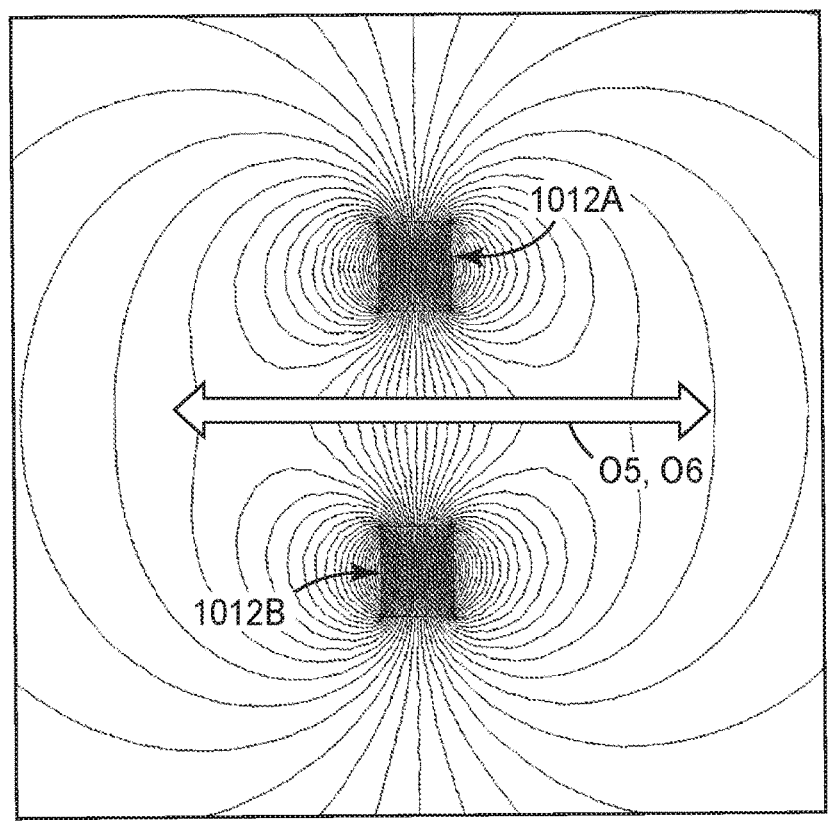
FIG. 10A shows a plot of the field lines illustrating the relative strength of the magnetic field as well as an arrow showing a direction of movement of the magnetic field of the embodiment of FIG. 10 according to an example of the present disclosure.

FIG. 10 shows another method 1000 that varies magnetic field by moving one or both a first magnet 1012A and a second magnet 1012B in an oscillatory manner as indicated by arrows O5 and O6 relative to a backing 1002 and the magnetizable abrasive particles 202 to orient magnetizable abrasive particles relative to the backing 1002. FIG. 10A is a plot of the field lines illustrating the relative strength of the magnetic field that results from the first magnet 1012A and the second magnet 1012B as well as an arrow O5, O6 showing a direction of variation of the magnetic field.

The first magnet 1012A and the second magnet 1012B can be constructed and arranged in a similar manner to that of the first magnet 912A and the second magnet 912B of FIG. 9, save that rather than being stationary relative to the backing 1002 and the magnetizable abrasive particles 202, one or both the first magnet 1012A and the second magnet 1012B can be moved relative to the backing 1002 and the magnetizable abrasive particles 202. The movement of the first magnet 1012A can be at a same speed and same direction as the second magnet 1012B according to one embodiment. In other embodiments, the speed and direction the first magnet 1012A moves relative to the second magnet 1012B can differ.

As one or both of the first magnet 1012A and the second magnet 1012B can be oscillated as indicated by arrows O5 and O6, the strength and/or angle of the magnetic field relative to each of the magnetizable abrasive particles 202 (FIG. 10) is varied. The magnetic field becomes relatively stronger relative to an individual one of the magnetizable abrasive particles 202 as the first magnet 1012A and the second magnet 1012B are moved into closer proximity thereto and becomes relatively weaker as the first magnet 1012A and the second magnet 1012B are moved a further distance away. Thus, FIGS. 10 and 10A illustrate another embodiment by which the magnetic field can be varied relative to the magnetizable abrasive particles (i.e. by relative movement between the magnet and the magnetizable abrasive particles).

Figure 11:
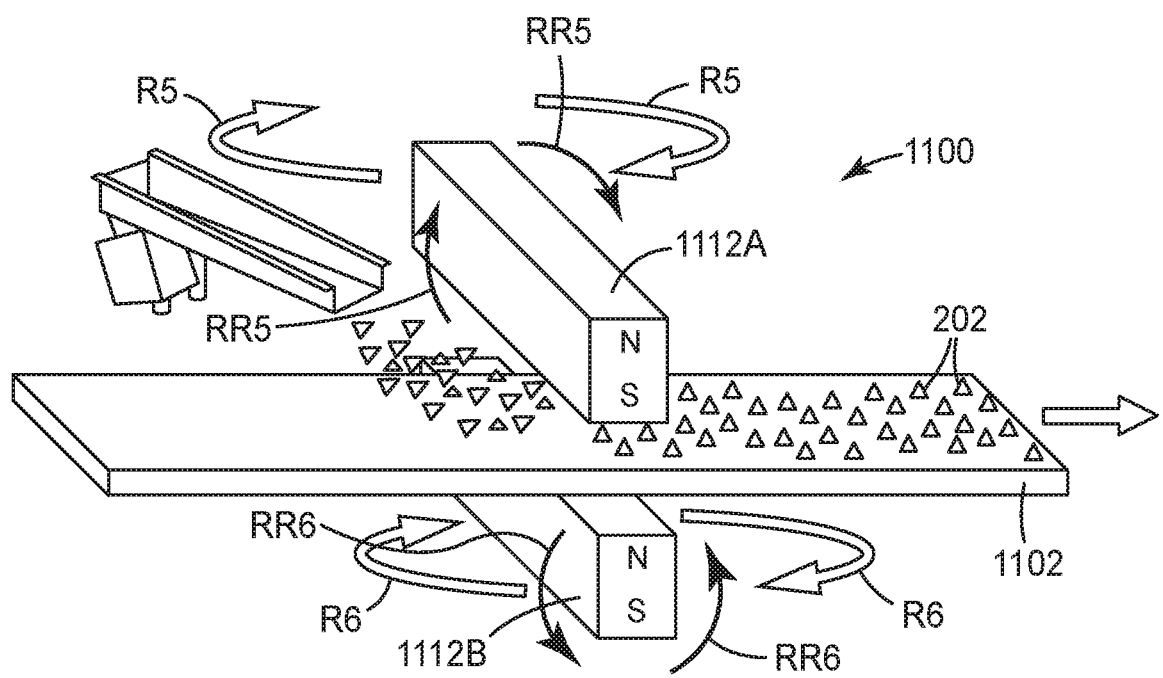
FIG. 11 is a schematic view of a ninth embodiment of a method that varies magnetic field by rotating one or both of a first magnet and a second magnet relative to a backing and the magnetizable abrasive particles to orient and/or align the magnetizable abrasive particles relative to the backing according to an example of the present disclosure.

FIG. 11 shows another method 1100 that varies magnetic field by moving one or both a first magnet 1112A and a second magnet 1112B in a rotational manner as indicated by arrows R5 and R6 (rotation around a first axis) and/or by rotation about a second axis as indicated by arrows RR5 and RR6 relative to a backing 1102 and the magnetizable abrasive particles 202 to orient magnetizable abrasive particles 202 relative to the backing 1102.

The first magnet 1112A and the second magnet 1112B can be constructed and arranged in a similar manner to that of the first magnet 912A and the second magnet 912B of FIG. 9, save that rather than being stationary relative to the backing 1102 and the magnetizable abrasive particles 202, one or both the first magnet 1112A and the second magnet 1112B can be rotated relative (as indicated by arrows R5, R6, RR5 and/or RR6) to the backing 1102 and the magnetizable abrasive particles 202. The rotation of the first magnet 1112A can be at a same speed and same direction as the second magnet 1112B according to one embodiment. In other embodiments, the speed and direction the first magnet 1112A moves relative to the second magnet 1112B can differ.

Figure 12:
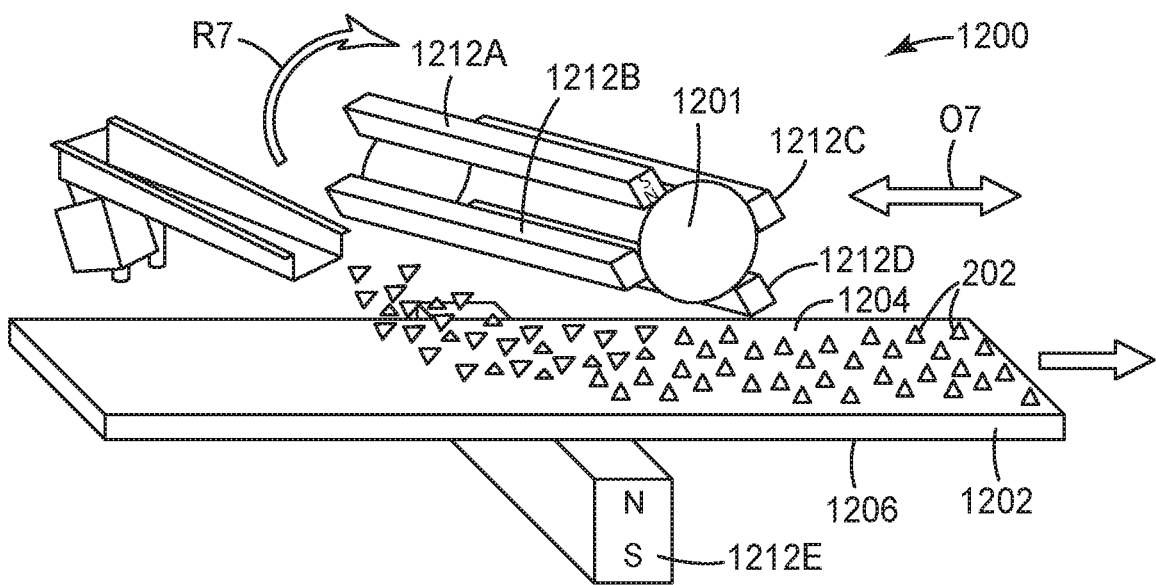
FIG. 12 is schematic view of a tenth embodiment of a method that varies magnetic field by rotating and/or translating a plurality of magnets and disposing a second magnet on an opposing second major surface of the backing from the plurality of magnets to orient and/or align the magnetizable abrasive particles relative to the backing according to an example of the present disclosure.

FIG. 12 shows a method 1200 that varies a magnetic field by rotating and/or oscillating a plurality of magnets 1212A, 1212B, 1212C and 1212D relative to the magnetizable abrasive particles 202 to orient magnetizable abrasive particles 202 relative to a backing 1202. The plurality of magnets 1212A, 1212B, 1212C and 1212D can be coupled to a member such as a cylinder 1201 as previously discussed to rotate therewith as indicated by arrow R7 and oscillate therewith as indicated by arrow O7. The plurality of magnets 1212A, 1212B, 1212C and 1212D can have the construction, disposition and can operate in a manner discussed in reference to the embodiments of FIGS. 6-7A. However, rather than being disposed above a mold the plurality of magnets 1212A, 1212B, 1212C and 1212D can be disposed above the backing 1202 having the magnetizable abrasive particles 202 disposed on or facing a first major surface thereof 1204. Optionally, a second magnet 1212E can be disposed on a second major surface 1206 (the second major surface 1206 opposing the first major surface 1204) of the backing 1202 from the plurality of magnets 1212A, 1212B, 1212C and 1212D. The second magnet 1212E can be oscillated or rotated relative to the backing 1202 and the magnetizable abrasive particles 202 according to some embodiments. Although five magnets are illustrated in FIG. 12, according to other embodiments more or fewer magnets can be utilized as desired.

Figure 13:
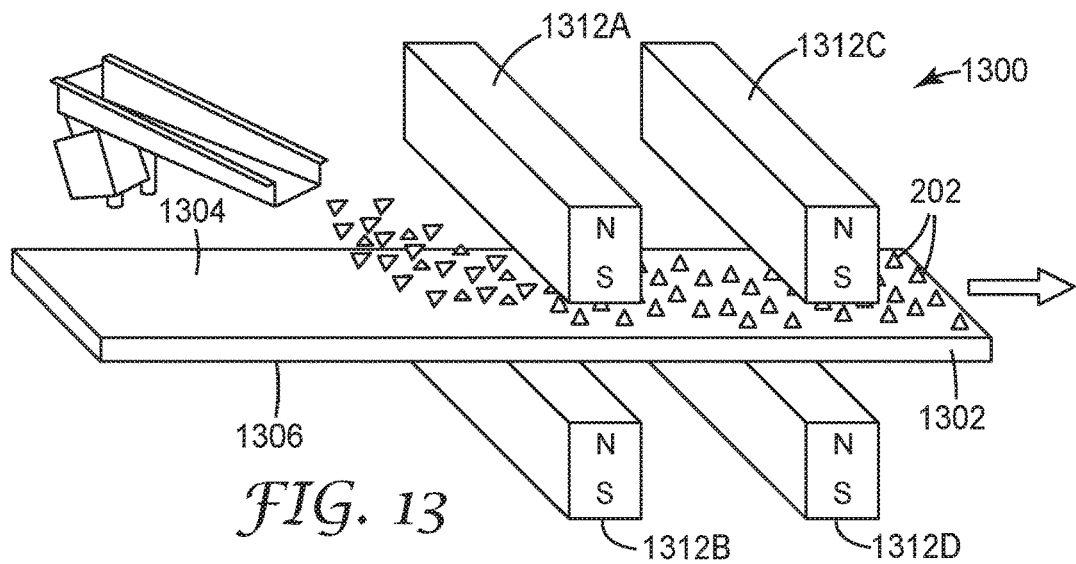
FIG. 13 is a schematic view of a eleventh embodiment of a method that varies magnetic field by passing a backing between a first magnet, a second magnet, a third magnet and a fourth magnet to orient and/or align the magnetizable abrasive particles relative to the backing, the first and third magnets disposed on same side of a first major surface of the backing and the second and fourth magnets disposed on an opposing second major surface of the backing according to an example of the present disclosure.

FIG. 13 shows a method 1300 that varies a magnetic field by passing a backing 1302 between a first magnet 1312A, a second magnet 1312B, a third magnet 1312C and a fourth magnet 1312D to orient magnetizable abrasive particles 202 relative to the backing 1302. The first magnet 1312A and third magnet 1312C are disposed on same side of a first major surface 1304 of the backing 1302 within a few feet thereof. The second magnet 1312B and the fourth magnet 1312D are disposed on a second major surface 1306 of the backing 1302 within a few feet thereof. The second major surface 1306 opposes the first major surface 1304. According to some embodiments, one or more of the first magnet 1312A, the second magnet 1312B, the third magnet 1312C and the fourth magnet 1312D can be rotated or oscillated in the manners previously discussed an illustrated herein. Although four magnets are illustrated in FIG. 13, according to other embodiments more or fewer magnets can be utilized as desired.

Figure 14:
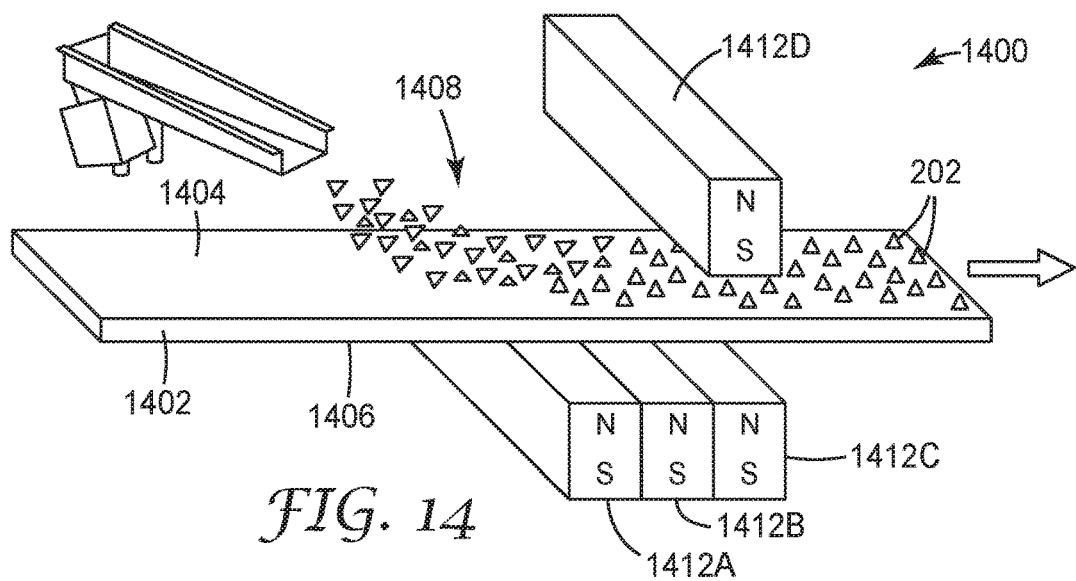
FIG. 14 is a schematic view of a twelfth embodiment of a method that varies magnetic field to orient and/or align the magnetizable abrasive particles relative to a backing by dropping the magnetizable abrasive particles to the backing having a plurality of magnets disposed adjacent a second major surface thereof in the drop region and passing the backing and the magnetizable abrasive particles over the plurality of magnets and between a first magnet and a second magnet, the first and second magnets disposed on either side of the major surfaces of a backing according to an example of the present disclosure.

FIG. 14 shows a method 1400 that varies a magnetic field to orient the magnetizable abrasive particles 202 by dropping the magnetizable abrasive particles 202 to a first major surface 1404 of a backing 1402 having a plurality of magnets 1412A, 1412B and 1412C disposed adjacent (within a few feet of) a second major surface 1406. The plurality of magnets 1412A, 1412B and 1412C can be disposed in a drop region 1408. The magnetic field exerted by the plurality of magnets 1412A, 1412B and 1412C can affect the fall of the magnetizable abrasive particles 202 to the first major surface 1404 and can orient the magnetizable abrasive particles 202 relative to the backing 1402.

Optionally, the backing 1402 and the magnetizable abrasive particles 202 can pass over the plurality of magnets 1412A, 1412B and 1412C. The backing 1402 can pass between a fourth magnet 1412D disposed to interface with an opposing major surface (the first major surface 1404) from the plurality of magnets 1412A, 1412B and 1412C. The second major surface 1406 opposes the first major surface 1404. According to some embodiments, one or more of the first magnet 1412A, the second magnet 1412B, the third magnet 1412C and the fourth magnet 1412D can be rotated or oscillated in the manners previously discussed an illustrated herein. Although four magnets are illustrated in FIG. 14, according to other embodiments more or fewer magnets can be utilized as desired.

Figure 15:
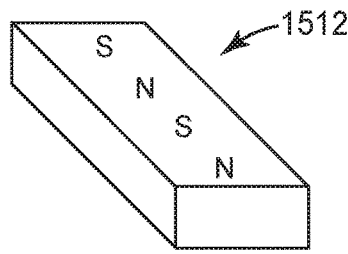
FIGS. 15 and 16 show alternative configurations or orientations for the magnets described in previously disclosed embodiments one to twelve.
Figure 16:
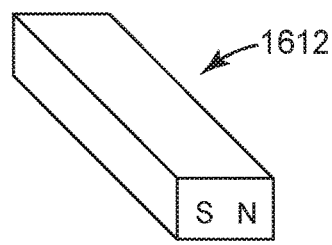

FIGS. 15 and 16 illustrate alternative magnet constructions (FIG. 15) and orientation (FIG. 16) that can be used as an alternative for any one or any combination of the magnets previously described with respect the illustrated methods. FIG. 15 shows a magnet 1512 with alternating poles in a cross-web (or y-axis direction if a mold is used) direction. FIG. 16 shows a magnet 1612 where the poles are oriented in a down-web or x-axis direction rather than the z-direction of FIGS. 2 and 9-14. Any one or any combination of the magnets shown in FIGS. 2 and 9-14 can utilize the poles in this illustrated orientation alone or in combination with the pole orientation shown in FIGS. 2 and 9-14.

Further methods can utilize distribution devices as disclosed in PCT International Publ. Nos. WO2017/007714, WO2017/007703, WO2016/205267, WO2015/100020, WO2015/100220 and WO2015/100018, which are each incorporated herein by reference in their entirety.

Figure 17:
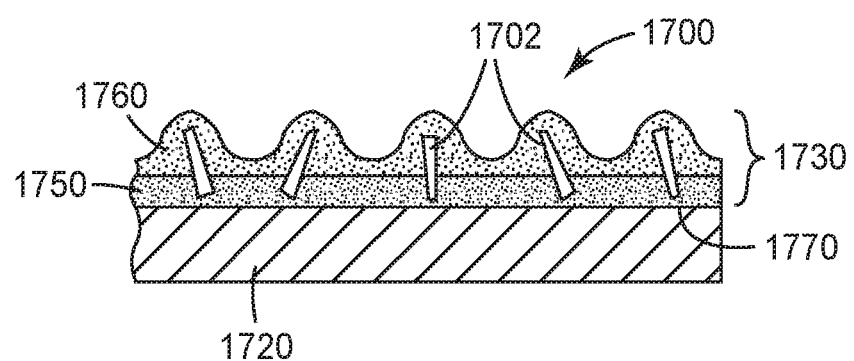
FIGS. 17 and 18 show exemplary coated abrasive articles that can be constructed using the methods described in the present disclosure.

FIG. 17 shows an exemplary coated abrasive article 1700 that can be made with any of the systems or apparatuses described previously. The coated abrasive article 1700 has a backing 1720 and an abrasive layer 1730. The abrasive layer 1730, includes functional magnetizable abrasive particles 1702 according to the present disclosure secured to the backing 1720 by make layer 1750 and size layer 1760, each comprising a respective binder (e.g., epoxy resin, urethane resin, phenolic resin, aminoplast resin, or acrylic resin) that may be the same or different. Exemplary backings include woven, knitted, or nonwoven fabrics, optionally treated with one or more of a saturant, presize layer, or tie layer.

Figure 18:
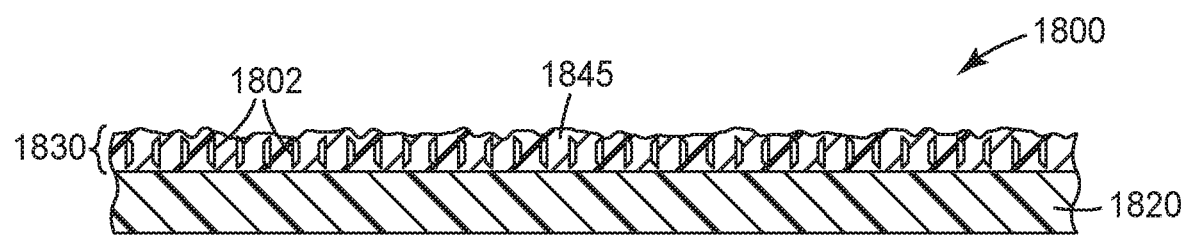

Another exemplary embodiment of a coated abrasive article 1800 is shown in FIG. 18. The abrasive coat may comprise a cured slurry comprising a curable binder precursor and functional abrasive particles according to the present disclosure. Referring to FIG. 18, exemplary coated abrasive article 1800 has a backing 1820 and an abrasive layer 1830. Abrasive layer 1830 includes magnetizable abrasive particles 1840 and a binder 1845 (e.g., epoxy resin, urethane resin, phenolic resin, aminoplast resin, acrylic resin).

Further details concerning the manufacture of coated abrasive articles according to the present disclosure can be found in, for example, U.S. Pat. No. 4,314,827 (Leitheiser et al.), U.S. Pat. No. 4,652,275 (Bloecher et al.), U.S. Pat. No. 4,734,104 (Broberg), U.S. Pat. No. 4,751,137 (Tumey et al.), U.S. Pat. No. 5,137,542 (Buchanan et al.), U.S. Pat. No. 5,152,917 (Pieper et al.), U.S. Pat. No. 5,417,726 (Stout et al.), U.S. Pat. No. 5,573,619 (Benedict et al.), U.S. Pat. No. 5,942,015 (Culler et al.), and U.S. Pat. No. 6,261,682 (Law).

Abrasive articles according to the present disclosure are useful for abrading a workpiece. Methods of abrading range from snagging (i.e., high pressure high stock removal) to polishing (e.g., polishing medical implants with coated abrasive belts), wherein the latter is typically done with finer grades of abrasive particles. One such method includes the step of frictionally contacting an abrasive article with a surface of the workpiece, and moving at least one of the abrasive article or the workpiece relative to the other to abrade at least a portion of the surface.

Examples of workpiece materials include metal, metal alloys, exotic metal alloys, ceramics, glass, wood, wood-like materials, composites, painted surfaces, plastics, reinforced plastics, stone, and/or combinations thereof. The workpiece may be flat or have a shape or contour associated with it. Exemplary workpieces include metal components, plastic components, particleboard, camshafts, crankshafts, furniture, and turbine blades. The applied force during abrading typically ranges from about 1 kilogram to about 100 kilograms.

Abrasive articles according to the present disclosure may be used by hand and/or used in combination with a machine. At least one of the abrasive article and the workpiece is moved relative to the other when abrading. Abrading may be conducted under wet or dry conditions. Exemplary liquids for wet abrading include water, water containing conventional rust inhibiting compounds, lubricant, oil, soap, and cutting fluid. The liquid may also contain defoamers, degreasers, for example.

The following embodiments are intended to be illustrative of the present disclosure and not limiting.

VARIOUS NOTES & EXAMPLES

Example 1 is a method of making an abrasive article, the method comprising: providing a surface; disposing magnetizable abrasive particles on the surface; and varying a magnetic field relative to the magnetizable abrasive particles to impart at least one of a non-random orientation and alignment to the magnetizable abrasive particles relative to the surface.

In Example 2, the subject matter of Example 1 optionally includes wherein varying the magnetic field relative to the magnetizable abrasive particles includes one or more of: moving the magnetizable abrasive particles relative to the magnetic field, moving the magnetic field relative to the magnetizable abrasive particles and varying a strength of the magnetic field.

In Example 3, the subject matter of any one or more of Examples 1-2 optionally include wherein on a respective basis, each of the magnetizable abrasive particles comprises a shaped body having at least one surface with a magnetizable layer disposed on at least a portion thereof.

In Example 4, the subject matter of Example 3 optionally includes wherein the shaped body comprises at least one of a triangular platelet and a rod.

In Example 5, the subject matter of any one or more of Examples 1-4 optionally include wherein the surface comprises a first major surface of a backing and the backing is translated as part of a continuous process.

In Example 6, the subject matter of Example 5 optionally includes dispensing the magnetizable abrasive particles on the backing at least one of outside of the magnetic field or in the magnetic field.

In Example 7, the subject matter of Example 6 optionally includes wherein the magnetizable abrasive particles are subjected to the magnetic field before or simultaneous with contacting the surface.

In Example 8, the subject matter of any one or more of Examples 1-7 optionally include wherein abrasive article comprises a coated article having a make layer precursor disposed on at least a portion of the surface, and further comprising: at least partially curing the make layer precursor; disposing a size layer precursor on at least a portion of the at least partially cured make layer precursor; and at least partially curing the size layer precursor.

In Example 9, the subject matter of any one or more of Examples 5-8 optionally include wherein varying the magnetic field relative to the magnetizable abrasive particles comprises disposing at least a first magnet adjacent the first major surface of the backing.

In Example 10, the subject matter of Example 9 optionally includes disposing at least a second magnet adjacent a second major surface of the backing, wherein the first major surface opposes the second major surface.

In Example 11, the subject matter of Example 10 optionally includes wherein varying the magnetic field relative to the magnetizable abrasive particles comprises at least one of: moving the magnetizable abrasive particles relative to the magnetic field, moving the magnetic field relative to the magnetizable abrasive particles, varying a strength of a first magnetic field produced by the first magnet, oscillating the first magnet up-web and down-web relative to the second magnet with the first magnet oriented substantially parallel with the first major surface, rotating the first magnet relative to the backing and the second magnet, rotating both the first magnet and the second magnet relative to the backing, arranging multiple magnets spaced from one another in the down-web direction, varying the polarity of one of the first magnet and the second magnet in one of a cross-web or the down-web direction, and disposing a third magnet up-web the first magnet and the second magnet in a drop area where the magnetizable abrasive particles are initially disposed on the backing.

In Example 12, the subject matter of any one or more of Examples 1-11 optionally include wherein the surface comprises a disc-shaped bottom surface of a mold, and wherein varying the magnetic field relative to the magnetizable abrasive particles comprises disposing at least a first magnet spaced from the magnetizable abrasive particles and the bottom surface.

In Example 13, the subject matter of Example 12 optionally includes wherein varying the magnetic field relative to the magnetizable abrasive particles comprises at least one of: moving the magnetizable abrasive particles relative to the magnetic field, moving the magnetic field relative to the magnetizable abrasive particles, varying a strength of the magnetic field.

In Example 14, the subject matter of Example 13 optionally includes wherein varying the magnetic field relative to the magnetizable abrasive particles comprises at least one of: oscillating a first magnet along a diameter of the mold along a first axis with the poles of the magnet maintained aligned with a second axis, oscillating the first magnet linearly along a diameter of the disc along the first axis with the poles of the first magnet are maintained aligned with the first axis, rotating the first magnet about an axis at a center of the mold, pivoting the first magnet about an axis at a center of the disc, translating the first magnet linearly along a diameter of the mold along the first axis with the poles of the first magnet rotated about a third axis, oscillating the first magnet linearly along a diameter of the mold along the first axis with the poles of the magnet rotated about a third axis, and oscillating the first magnet linearly along a diameter of the disc along the first axis with the poles of the first magnet alternated along the third axis.

In Example 15, the subject matter of any one or more of Examples 12-14 optionally include wherein the abrasive article comprises a bonded article and the surface comprises a surface of the mold.

In Example 16, the subject matter of Example 15 optionally includes wherein the bonded articles comprises one of a vitrified bonded article and a resin bonded article.

In Example 17, the subject matter of any one or more of Examples 15-16 optionally include wherein the bonded abrasive article includes one or more layers, and wherein at least one of the layers is formed of a curable composition, the curable composition formed by at least some of the magnetizable abrasive particles.

In Example 18, the subject matter of Example 17 optionally includes wherein the bonded abrasive article has reinforcing material.

In Example 19, the subject matter of Example 18 optionally includes varying a magnetic field relative to the curable composition such that a majority of the magnetizable abrasive particles are at least one of oriented and aligned in a non-random manner relative to the surface of the mold; and at least partially curing the curable composition to provide the bonded abrasive article.

In Example 20, the subject matter of any one or more of Examples 1-19 optionally include degrees relative to the surface.

In Example 21, the subject matter of any one or more of Examples 1-20 optionally include wherein the magnetizable abrasive particles each have one or more magnetic layers each of the one or more magnetic layers substantially covers the entire surface of the shaped ceramic body.

Example 22 is a method of making a coated abrasive article, the method comprising: providing a backing; disposing magnetizable abrasive particles on the backing; varying a magnetic field relative to the magnetizable abrasive particles to impart at least one of a non-random orientation and alignment to the magnetizable abrasive particles relative to the backing.

In Example 23, the subject matter of Example 22 optionally includes wherein the backing includes a first major surface and an opposing second major surface and the backing is translated as part of a continuous process.

In Example 24, the subject matter of Example 23 optionally includes dispensing the magnetizable abrasive particles on the backing up-web of the magnetic field.

In Example 25, the subject matter of any one or more of Examples 22-24 optionally include wherein the magnetizable abrasive particles are subjected to the magnetic field before or simultaneous with contacting the backing.

In Example 26, the subject matter of any one or more of Examples 22-25 optionally include wherein the abrasive article has a make layer precursor disposed on at least a portion of the first major surface, and further comprising: at least partially curing the make layer precursor; disposing a size layer precursor on at least a portion of the at least partially cured make layer precursor; and at least partially curing the size layer precursor.

In Example 27, the subject matter of any one or more of Examples 22-26 optionally include wherein varying the magnetic field relative to the magnetizable abrasive particles comprises disposing at least a first magnet adjacent one of the first major surface or a second opposing major surface of the backing.

In Example 28, the subject matter of any one or more of Examples 22-27 optionally include disposing at least a second magnet adjacent the second major surface of the backing.

In Example 29, the subject matter of Example 28 optionally includes wherein varying the magnetic field relative to the magnetizable abrasive particles comprises at least one of: moving the magnetizable abrasive particles relative to the magnetic field, varying a strength of a first magnetic field produced by the first magnet, oscillating the first magnet up-web and down-web relative to the second magnet with the first magnet oriented substantially parallel with the first major surface, rotating the first magnet relative to the backing and the second magnet, rotating both the first magnet and the second magnet relative to the backing, arranging multiple magnets spaced from one another in the down-web direction, varying the polarity of one of the first magnet and the second magnet in one of a cross-web or the down-web direction, and disposing a third magnet up-web the first magnet and the second magnet in a drop area where the magnetizable abrasive particles are initially disposed on the backing.

Example 30 is a method of making a bonded abrasive article, the method comprising: disposing a layer of a curable composition into a mold having a circular mold cavity with a central hub, wherein the circular mold cavity has an outer circumference and a rotational axis extending through the central hub, and wherein the curable composition is comprised of at least some magnetizable abrasive particles dispersed therein; and varying a magnetic field relative to the curable composition such that a majority of the magnetizable abrasive particles are at least one of oriented and aligned in a non-random manner relative to a surface of the mold; and at least partially curing the curable composition to provide the bonded abrasive article.

In Example 31, the subject matter of Example 30 optionally includes wherein the surface of the mold comprises disc-shaped bottom surface and wherein varying the magnetic field relative to the magnetizable abrasive particles comprises disposing at least a first magnet spaced from the magnetizable abrasive particles and the bottom surface.

In Example 32, the subject matter of any one or more of Examples 30-31 optionally include wherein varying the magnetic field relative to the magnetizable abrasive particles comprises at least one of: varying a strength of the magnetic field produced by the first magnet, oscillating along a diameter of the mold along a first axis with the poles of the magnet maintained aligned with a second axis, oscillating the first magnet linearly along a diameter of the disc along the first axis with the poles of the magnet maintained aligned with the first axis, rotating the first magnet about an axis at a center of the mold, pivoting the first magnet about an axis at a center of the disc, translating the first magnet linearly along a diameter of the mold along the first axis with the poles of the magnet rotated about a third axis, oscillating the first magnet linearly along a diameter of the mold along the first axis with the poles of the magnet rotated about a third axis, and oscillating the first magnet linearly along a diameter of the disc along the first axis with the poles of the magnet alternated along the third axis.

Example 33 is a method of making a non-woven abrasive article, the method comprising: providing a non-woven backing; disposing magnetizable abrasive particles on the backing; varying a magnetic field relative to the magnetizable abrasive particles to impart at least one of a non-random orientation and alignment of the magnetizable abrasive particles relative to the backing.

WORKING EXAMPLES

Unless otherwise noted, all parts, percentages, ratios, etc. in the Examples and the rest of the specification are by weight. Unless stated otherwise, all other reagents were obtained, or are available from fine chemical vendors such as Sigma-Aldrich Company, St. Louis, Mo., or may be synthesized by known methods.

Material abbreviations used in the Examples are described in Table 1, below.

Unit Abbreviations Used in the Examples:
° C.: degrees Centigrade
cm: centimeter
g/m$^2$: grams per square meter
mm: millimeter Material abbreviations used in the Examples are described in Table 1, below.

TABLE 1

| ABBREVIATION | DESCRIPTION |
| --- | --- |
| AO | grade 24 aluminum oxide abrasive particles available as 24 BFRPL from Treibacher Schleifmettel AG, Villach, Austria. |
| PAF | potassium fluoroaluminate, particle size distribution $d_{10}$ = 2.58 micrometers, $d_{50}$ = 11.5 micrometers, $d_{90}$ = 36.6 micrometers, from KBM Afflips B.V., Oss, The Netherlands. |
| PRL | liquid phenolic resin, available as DYNEA 5136G from Dynea Oy Corporation, Helsinki, Finland. |
| PRP | phenolic resin powder, available as VARCUM 29302 from Durez Corporation, Dallas, Texas. |
| PMIX | 50:50 blend of PAF and PRP mixed in a V-blender for 3 hours. |
| SAP | Shaped abrasive particles were prepared according to the disclosure of U.S. Pat. No. 8,142,531 (Adefris et al). The shaped abrasive particles were prepared by molding alumina sol gel in equilateral triangle-shaped polypropylene mold cavities. After drying and firing, the resulting shaped abrasive particles were about 1.4 mm (side length) × 0.25 mm (thickness), with a draft angle approximately 98 degrees. |
| SCRIM1 | fiberglass mesh obtained as STYLE 4400 from Industrial Polymer and Chemicals, Inc., Shrewsbury, Massachusetts. |
| SCRIM2 | fiberglass mesh from Tissa Glasweberei AG, Oberkulm, Switzerland. |

Preparation of Magnetizable Abrasive Particles

SAP was coated with 304 stainless steel using physical vapor deposition with magnetron sputtering, 304 stainless steel sputter target, described by Barbee et al. in Thin Solid Films, 1979, vol. 63, pp. 143-150, deposited as the magnetic ferritic body centered cubic form. The apparatus used for the preparation of 304 stainless steel film coated abrasive particles (i.e., magnetizable abrasive particles) was disclosed in U.S. Pat. No. 8,698,394 (McCutcheon et al.). 3592 grams of SAP were placed in a particle agitator that was disclosed in U.S. Pat. No. 7,727,931 (Brey et al., Column 13, line 60). The blade end gap distance to the walls of the agitator was 1.7 mm. The physical vapor deposition was carried out for 12 hours at 5.0 kilowatts at an argon sputtering gas pressure of 10 millitorr (1.33 pascal) onto SAP. The density of the coated SAP was 3.912 grams per cubic centimeter (the density of the uncoated SAP was 3.887 grams per cubic centimeter). The weight percentage of metal coating in the coated abrasive particles was 0.65% and the coating thickness is 1 micron.

Preparation of Mixes

Mixes were prepared according to the composition listed in Table 2. Each mix was prepared by first mixing AO or SAP with PRL for 7 minutes in a paddle mixer, then the PMIX powder blend was added and mixed for 7 additional minutes.

TABLE 2

| | Amount (grams) | | |
| --- | --- | --- | --- |
| Component | Mix 1 | Mix 2 | Mix 3 |
| AO | 720 | — | — |
| SAP (uncoated) | — | 720 | — |
| Coated SAP | — | — | 720 |
| PMIX | 225 | 225 | 225 |
| PRL | 55 | 55 | 55 |

Example 1

A Type 27 depressed-center composite grinding wheel was prepared as follows. A 304 stainless steel mold shell with a 6.5-inch outer diameter (OD), 4.497-inch inner diameter (ID) and a height of 2 inches was placed on a carbon steel plate of 10.0 inches wide, 10.0 inches long, and 0.25 inches thick. The shell was located at the center of the carbon steel plate. Three round 0.75-inch diameter by 0.25-inch thick N42 Neodymium magnets were placed inside the mold attaching to the carbon steel plate with equal spacing from each other and the wall of the shell.

A carbon steel bottom plate with an OD of 4.492 inches, ID of 0.878 inch, and thickness of 0.25 inch was set inside of the outer shell and slid down to contact the three round magnets such that the magnetic force held the bottom plate firmly in place. Additionally, a 304 stainless steel pin was placed in the center hole of the bottom plate. The pin was 0.874 inch in diameter and 1.5 inch tall.

A 4.5-inch diameter disc of SCRIM1 was placed into the mold. Mix 1 (75 grams) was spread out evenly and a second 4.5-inch disc of SCRIM1 was placed on top of the mix 1. Mix 3 (75 grams) was spread out evenly on the second scrim. A 3-inch SCRIM2 disc was inserted and centered into the cavity.

A 1-inch×1-inch×6-inch long N48 magnet assembly was then centered over the top of the mold and rotated twenty times around the central axis with the south pole of the magnet assembly facing the mold. The magnet assembly was spaced 0.25 inch above the surface of the mold during rotation. The rotation of the magnet assembly resulted in annular alignment of the shaped abrasive particle.

The magnet was removed and the filled cavity mold was then pressed at a pressure of 30 tons. The resulting wheel was removed from the cavity mold and placed on a spindle between depressed-center aluminum plates in order to be pressed into a Type 27 depressed-center grinding wheel. The wheel was compressed at 5 tons to shape the disc. The wheel was then placed in an oven to cure for 7 hours at 79° C., 3 hours at 107° C., 18 hours at 185° C., and a temperature ramp-down over 4 hours to 27° C. The dimensions of the final grinding wheel were 114.3 (millimeters, mm) diameter×6.35 mm thickness. The center hole was ⅞ inch (2.2 cm) in diameter.

Figure 19:
FIG. 19 is a digital image of magnetizable abrasive particles disposed within a grinding wheel and oriented according to the process described in Example 1.

This resulted in the abrasive particles having substantial annular alignment, as shown in FIG. 19.

Example 2

Figure 20:
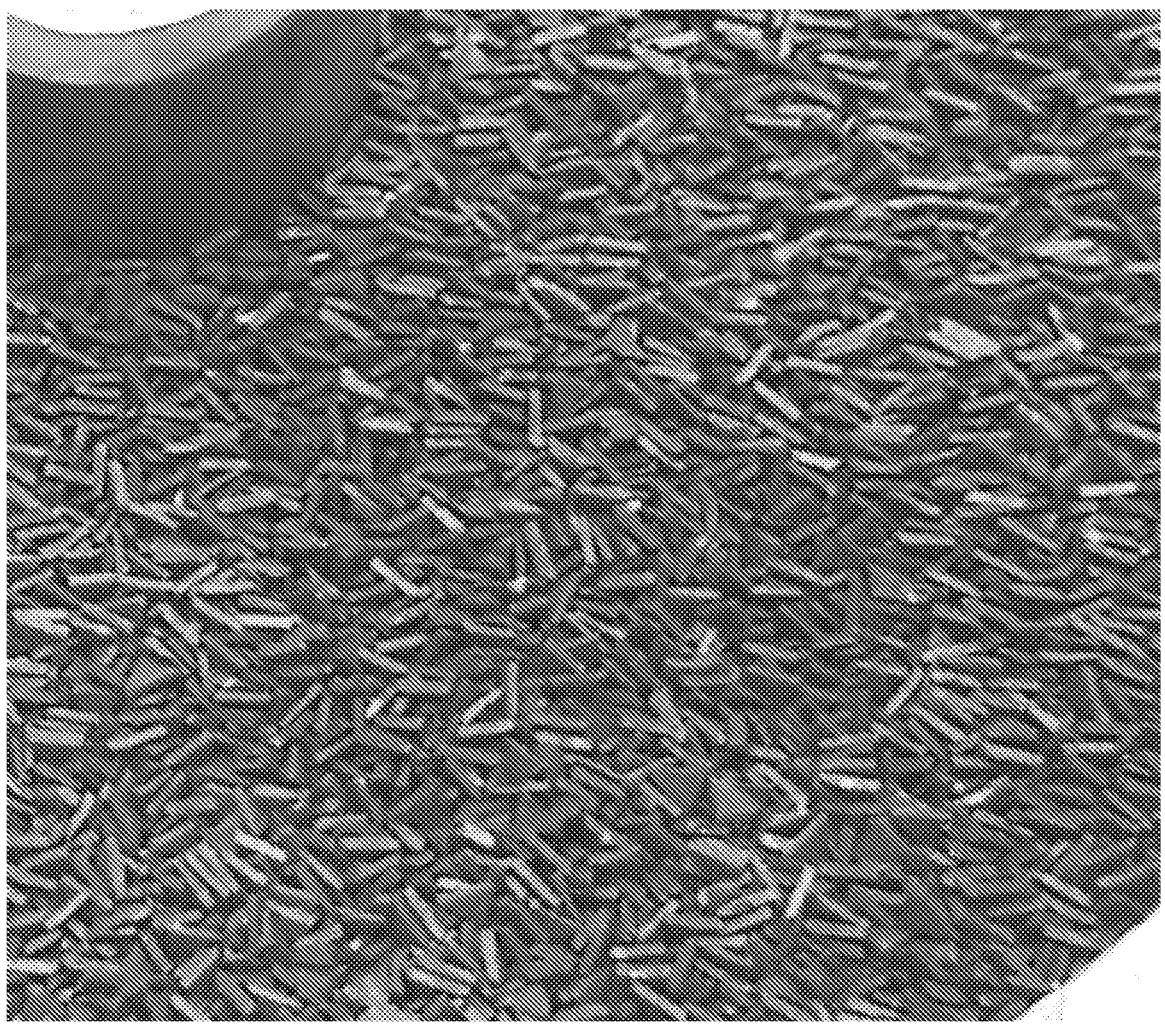
FIG. 20 is a digital image of magnetizable abrasive particles disposed within a second grinding wheel and oriented according to the process described in Comparative Example 2.

The procedure described above in EXAMPLE 1 was repeated, except that the procedure was carried out by oscillating the magnet assembly in a linear motion forward and backward twenty times following the oscillatory method described in reference to FIG. 2. This resulted in the abrasive particles having substantial linear alignment, as shown in FIG. 20.

Comparative Example A

Figure 21:
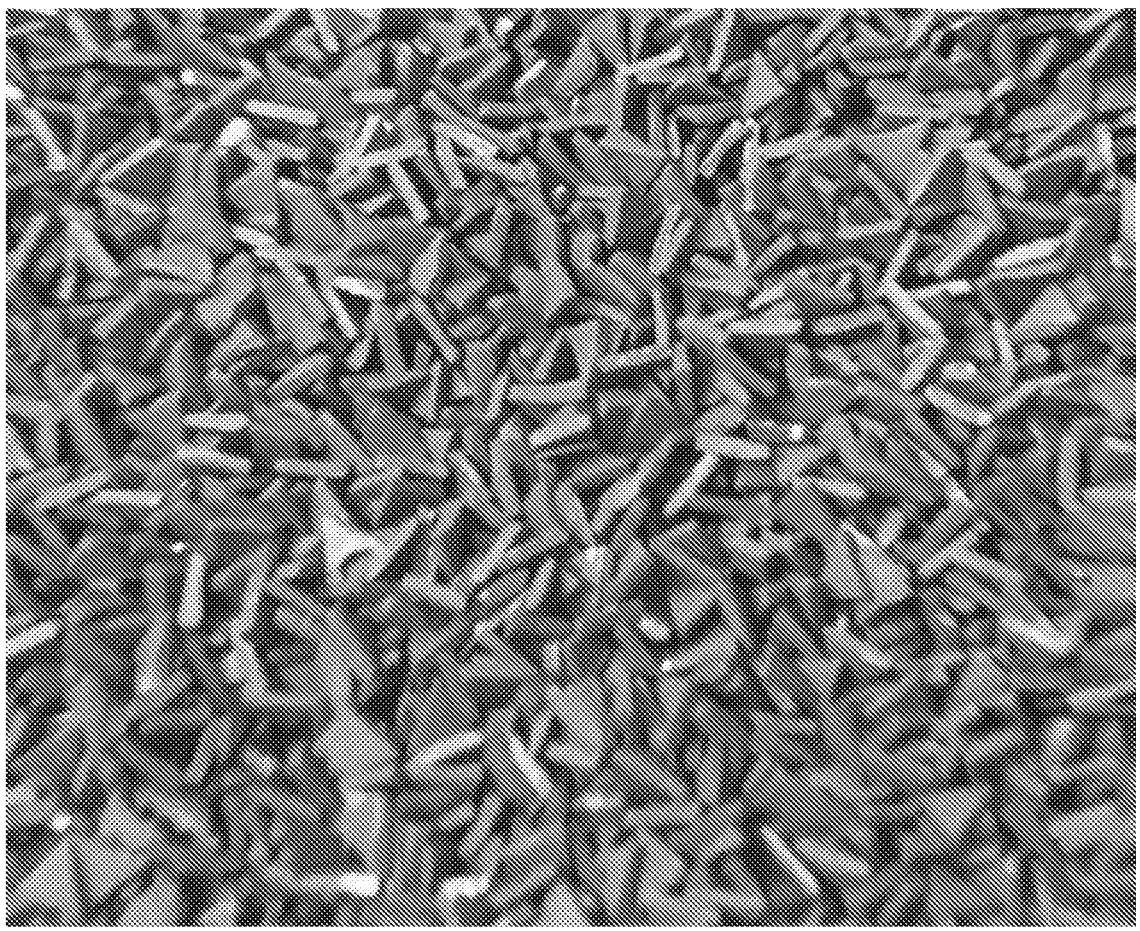
FIG. 21 is a digital image of magnetizable abrasive particles disposed within a grinding wheel and oriented but not substantially aligned according to the process described in Comparative Example A.

The procedure described above in COMPARATIVE EXAMPLE 2 was repeated, except that the magnet was only passed over the magnet once. The orientation of the abrasive particles is upright, however the alignment of the particles is random in the resulting grinding wheel is shown in FIG. 21.

Performance Test

The wheels were mounted on a GTG25 pneumatic grinder (obtained from Atlas Copco, Nacka, Sweden) which was in turn mounted to a robotic arm to precisely control movement. The wheels were tested grinding against a 1018 cold rolled steel workpiece with 2-inch (5.18-cm) height, 0.25-inch (0.64-cm) thickness and 18-inch (45.72-cm) length. The abrasive article was then urged at an angle of 12.5 degrees against the workpiece at a load of 9 pounds (4.08 kilograms). The grinder continuously traversed back and forth across the entire steel bar on the 0.25-inch edge. The wheel was tested for 10 minutes. The mass of the workpiece was measured before and after the test to determine the cut in grams. The wheel was weighed before and after the test to determine the wear in grams. G-ratio was calculated as the ratio of cut to wear. The results are shown in Table 3.

TABLE 3

|  | WHEEL WEAR, grams |
| --- | --- |
| EXAMPLE 1 | 7.58 |
| EXAMPLE 2 | 8.92 |
| COMPARATIVE EXAMPLE A | 10.50 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

That claimed invention is:

1. A method of making an abrasive article, the method comprising:
   providing a surface;
   disposing magnetizable abrasive particles on the surface;
   disposing a first magnet adjacent the surface;
   varying a magnetic field relative to the magnetizable abrasive particles to impart at least one of a non-random orientation and alignment to the magnetizable abrasive particles relative to the surface by varying a strength of a first magnetic field produced by the first magnet.

2. The method of claim 1, wherein varying the magnetic field relative to the magnetizable abrasive particles includes one or more of: moving the magnetizable abrasive particles relative to the magnetic field, moving the magnetic field relative to the magnetizable abrasive particles and varying a strength of the magnetic field.

3. The method of claim 1, wherein on a respective basis, each of the magnetizable abrasive particles comprises a shaped body having at least one surface with a magnetizable layer disposed on at least a portion thereof.

4. The method claim of 1, wherein the surface comprises a first major surface of a backing and the backing is translated as part of a continuous process.

5. The method of claim 4, further comprising dispensing the magnetizable abrasive particles on the backing at least one of outside of the magnetic field or in the magnetic field.

6. The method of claim 5, wherein the magnetizable abrasive particles are subjected to the magnetic field before or simultaneously with contacting the surface.

7. The method of claim 1, wherein the surface is a first major surface of a backing, and wherein the method further comprising disposing at least a second magnet adjacent a second surface of the backing, wherein the first major surface opposes the second major surface.

8. The method of claim 7, wherein varying the magnetic field relative to the magnetizable abrasive particles also comprises at least one of: moving the magnetizable abrasive particles relative to the magnetic field, moving the magnetic field relative to the magnetizable abrasive particles, rotating the first magnet relative to the backing and the second magnet, rotating both the first magnet and the second magnet relative to the backing, arranging multiple magnets spaced from one another in the down-web direction, varying the polarity of one of the first magnet and the second magnet in one of a cross-web or the down-web direction, disposing a third magnet up-web the first magnet and the second magnet in a drop area where the magnetizable abrasive particles are initially disposed on the backing.

9. The method of claim 1, wherein a majority of the magnetizable abrasive particles have a major planar surface disposed at an angle of at least 70 degrees relative to the surface.

10. The method of claim 1, wherein the magnetizable abrasive particles each have one or more magnetic layers each of the one or more magnetic layers substantially covers the entire surface of the shaped ceramic body.

11. A method of making a coated abrasive article, the method comprising:
providing a backing;
disposing magnetizable abrasive particles on the backing;
varying a magnetic field relative to the magnetizable abrasive particles to impart at least one of a non-random orientation and alignment to the magnetizable abrasive particles relative to the backing, wherein varying comprises oscillating a first magnet up-web and down-web relative to a second magnet with the first magnet oriented substantially parallel with the backing.

12. The method of claim 11, wherein the backing includes a first major surface and an opposing second major surface and the backing is translated as part of a continuous process.

13. The method claim 11, wherein the magnetizable abrasive particles are subjected to the magnetic field before or simultaneous with contacting the backing.

14. The method of claim 11, wherein varying the magnetic field relative to the magnetizable abrasive particles also comprises at least one of: moving the magnetizable abrasive particles relative to the magnetic field, rotating both the first magnet and the second magnet relative to the backing, arranging multiple magnets spaced from one another in the down-web direction, varying the polarity of one of the first magnet and the second magnet in one of a cross-web or the down-web direction, and disposing a third magnet up-web the first magnet and the second magnet in a drop area where the magnetizable abrasive particles are initially disposed on the backing.

15. A method of making a coated abrasive article, the method comprising:
providing a backing;
disposing magnetizable abrasive particles on the backing;
disposing at least a first magnet adjacent one of the first major surface or a second opposing major surface of the backing; and
varying a magnetic field relative to the magnetizable abrasive particles to impart at least one of a non-random orientation and alignment to the magnetizable abrasive particles relative to the backing; wherein varying the magnetic field comprises:
rotating both the first magnet and the second magnet relative to the backing, arranging multiple magnets spaced from one another in the down-web direction,
varying the polarity of one of the first magnet and the second magnet in one of a cross-web or the down-web direction; or
disposing a third magnet up-web the first magnet and the second magnet in a drop area where the magnetizable abrasive particles are initially disposed on the backing.

* * * * *

UNITED STATES PATENT AND TRADEMARK OFFICE
CERTIFICATE OF CORRECTION

PATENT NO. : 11,141,835 B2
APPLICATION NO. : 16/478526
DATED : October 12, 2021
INVENTOR(S) : Ronald Jesme Page 1 of 1

It is certified that error appears in the above-identified patent and that said Letters Patent is hereby corrected as shown below:

In the Claims

<u>Column 26</u>
Line 42, In Claim 4, delete "claim of 1" and insert -- of claim 1 --, therefor.
Line 66, In Claim 8, insert -- or -- before "disposing".

<u>Column 27</u>
Line 9, In Claim 10, insert -- , -- before "each of the one".

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*